(12) United States Patent
Eguchi

(10) Patent No.: US 10,761,406 B2
(45) Date of Patent: Sep. 1, 2020

(54) OPTICAL SYSTEM, IMAGE CAPTURING APPARATUS, DISTANCE MEASURING APPARATUS, AND VEHICLE-MOUNTED SYSTEM

(71) Applicant: CANON KABUSHIKI KAISHA, Tokyo (JP)

(72) Inventor: Kaoru Eguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 133 days.

(21) Appl. No.: 16/185,095

(22) Filed: Nov. 9, 2018

(65) Prior Publication Data

US 2020/0026161 A1 Jan. 23, 2020

(30) Foreign Application Priority Data

Nov. 17, 2017 (JP) .................. 2017-221657

(51) Int. Cl.
  *G03B 17/17* (2006.01)
  *H04N 13/239* (2018.01)
  *G02B 17/06* (2006.01)
  *G02B 17/08* (2006.01)

(52) U.S. Cl.
  CPC ......... *G03B 17/17* (2013.01); *G02B 17/0663* (2013.01); *G02B 17/0848* (2013.01); *H04N 13/239* (2018.05)

(58) Field of Classification Search
  CPC ...... G03B 17/17; G03B 35/08; H04N 13/239; B60Q 9/008; B60Q 5/006; B60T 7/22; G01C 3/08; G01C 11/02; G02B 17/008; G02B 17/0663; G02B 17/0848; G08G 1/166

See application file for complete search history.

(56) References Cited

U.S. PATENT DOCUMENTS 6,896,382 B2 5/2005 Yoshikawa et al.

FOREIGN PATENT DOCUMENTS

| EP | 1160610 A1 | 12/2001 |
|---|---|---|
| JP | H09159912 A | 6/1997 |
| JP | 2007192966 A | 8/2007 |
| JP | 2008052287 A | 3/2008 |
| JP | 2018097189 A | 6/2018 |
| WO | 2011077988 A1 | 6/2011 |

OTHER PUBLICATIONS

Extended European Search Report issued in European Appln. No. 18206156.4 dated Apr. 25, 2019.

*Primary Examiner* — Wen Huang

(74) *Attorney, Agent, or Firm* — Rossi, Kimms & McDowell LLP

(57) ABSTRACT

An optical system (L0) that forms an image of an object and that includes an aperture stop (SP), a first reflection surface (R2), and a second reflection surface (R3) which are disposed in order from an enlargement side to a reduction side, an area of the first reflection surface is larger than an area of the second reflection surface, a reference axis is a path of a reference ray that passes through an opening center of the aperture stop to reach a center of a reduction plane, and an angle ∠QPR (deg) between a line segment PQ connecting the opening center P and an intersection Q of the reference axis and the first reflection surface, and a line segment PR connecting the opening center P and an intersection R of the reference axis and the second reflection surface satisfies a predetermined condition.

23 Claims, 16 Drawing Sheets

OPTICAL SYSTEM, IMAGE CAPTURING APPARATUS, DISTANCE MEASURING APPARATUS, AND VEHICLE-MOUNTED SYSTEM

BACKGROUND OF THE INVENTION

Field of the Invention

The present invention relates to a wide-angle optical system.

Description of the Related Art

As a wide-angle lens applied to surveillance cameras, vehicle-mounted cameras, UAVs (Unmanned Aerial Vehicles), and the like, a wide-angle lens including a reduced number of components to achieve a small size while ensuring a wide field of view is known. Japanese Patent Laid-open No. H9-159912 discloses a wide-angle lens including a biconcave lens having a negative refractive power, an aperture stop, and a biconvex lens having a positive refractive power, which are arranged in order from an object side.

Incidentally, the vehicle-mounted camera or the UAV measures a distance from an image and uses the result for performing sensing such as controlling the own vehicle (or own device), so that it is necessary to reduce distortion while achieving a wide-angle configuration. However, when attempting to construct an optical system with a refracting lens disclosed in Japanese Patent Laid-open No. H9-159912, it is difficult to achieve both the wide angle configuration and reduction of the distortion, and it is necessary to provide a large number of lenses in order to satisfy both of these requirements, which results in increase in size.

SUMMARY OF THE INVENTION

The present invention provides an optical system, a stereo optical system, an image capturing apparatus, a distance measuring apparatus, a vehicle-counted system, and a moving apparatus which are capable of reducing distortion while simultaneously achieving a wide angle and miniaturization.

An optical system as one aspect of the present invention forms an image of an object, includes an aperture stop, a first reflection surface, and a second reflection surface, the aperture stop, the first reflection surface, and the second reflection surface are disposed in order from an enlargement side to a reduction side, an area of the first reflection surface is larger than an area of the second reflection surface, and a predetermined expression is satisfied, where a reference axis is a path of a reference ray that passes through an opening center of the aperture stop to reach a center of a reduction plane, P is the opening center, Q is an intersection of the reference axis and the first reflection surface, R is an intersection of the reference axis and the second reflection surface, and ∠QPR is an angle (deg) between a line segment PQ connecting the opening center P and the intersection Q and a line segment PR connecting the opening center P and the intersection R.

A stereo optical system as another aspect of the present invention includes the two optical systems, and reduction planes of the two optical systems are on the same plane.

An image capturing apparatus as another aspect of the present invention includes the stereo optical system and an image sensor configured to receive images formed by the two optical systems.

An image capturing apparatus as another aspect of the present invention includes the optical system and an image sensor configured to receive an image formed by the optical system.

A distance measuring apparatus as another aspect of the present invention includes the image capturing apparatus and an acquirer configured to acquire distance information of the object based on an output of the image sensor.

A vehicle-mounted system as another aspect of the present invention includes the distance measuring apparatus and a determiner configured to determine a possibility of collision between a vehicle and the object based on the distance information.

A moving apparatus as another aspect of the present invention includes the distance measuring apparatus, and the moving apparatus is movable while holding the distance measuring apparatus.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings. First, matters common to each embodiment will be described together with an outline of the present invention.

Matters Common to Each Embodiment

1) Definition of Optical Coordinate System Etc.

Figure 10:
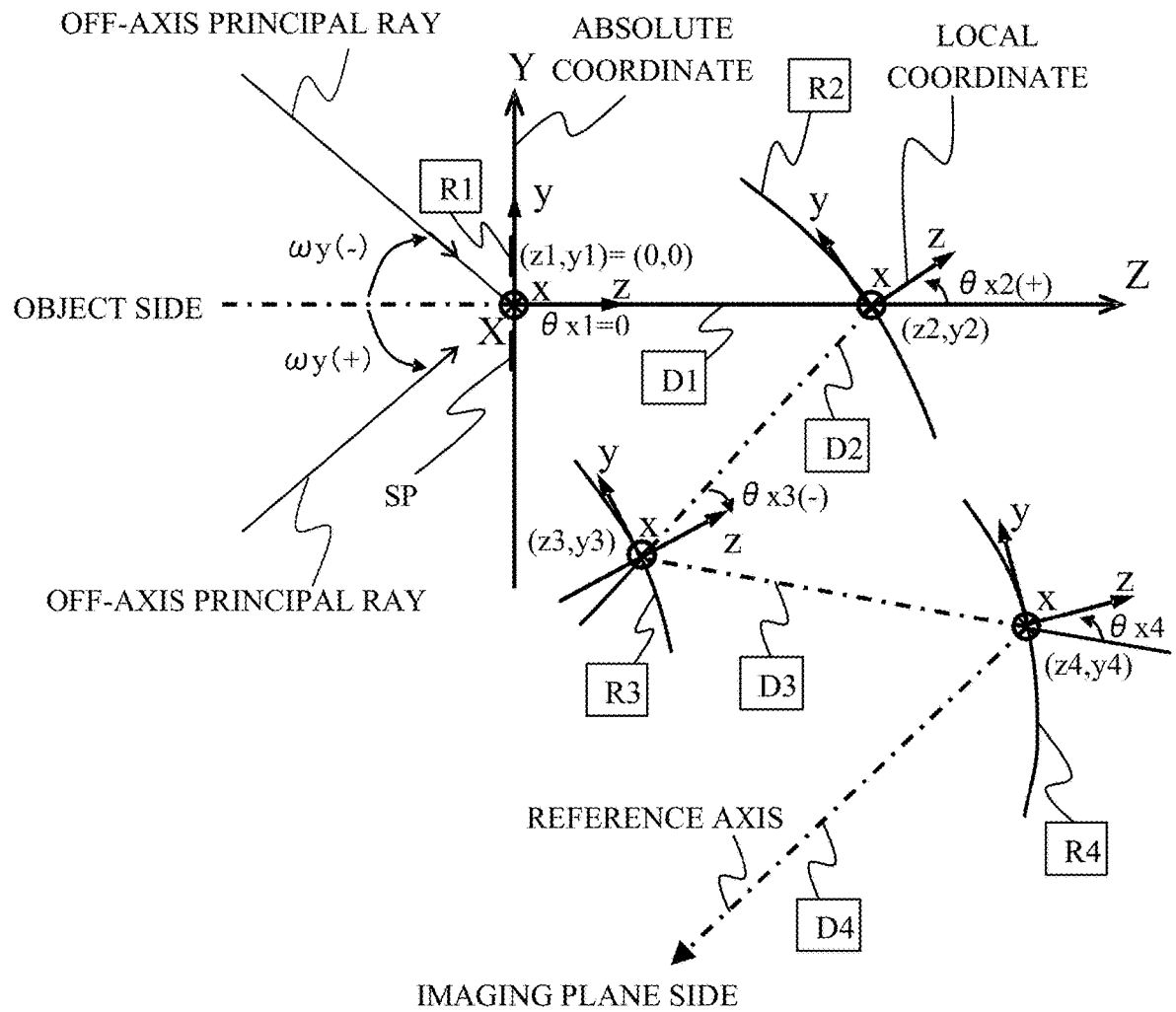
FIG. 10 is an explanatory diagram of a coordinate system in each embodiment.

FIG. 10 is an explanatory diagram of a coordinate system that defines configuration data of an imaging optical system used for an optical system (stereo optical system) of each embodiment. In each embodiment, a ray that passes through the center (opening center) of a pupil (diaphragm: aperture stop SP) from the center of an object plane (not illustrated) to reach the center of an image plane, from an object side toward an image side (imaging plane formed on an image sensor), is defined as a central principal ray or a reference axis ray. It is also possible to say that the object side is an enlargement conjugate side and the image side is a reduction conjugate side. In FIG. 10, the central principal ray or the reference axis ray is indicated by a dashed-dotted line. Also, a path that the central principal ray or the reference axis ray traces is defined as a reference axis. Also, along the reference axis, an i-th surface from the object side is an i-th surface Ri. The reference axis does not intersect with itself.

In FIG. 10, a first surface R1 is an aperture stop SP (diaphragm surface) disposed on an optical path, a second surface R2 is a reflection surface tilted with respect to the first surface R1, and the third surface R3 and the fourth surface R4 are reflection surfaces shifted and tilted with respect to respective front surfaces. Each of the second surface R2 to the fourth surface R4 is a mirror made of a medium such as metal, glass, plastic or the like. The reflection surfaces are not limited to the first surface R1 to the fourth surface R4, and the reflection surface may follow the fifth surface R5 and beyond.

Since the imaging optical system in the stereo optical system of each embodiment is an off-axial optical system (off-axial optical system), each surface constituting the imaging optical system does not have a common optical axis. Therefore, in each embodiment, an absolute coordinate system of the imaging optical system with the center of the first surface R1 as the origin is set. That is, a path where a ray (central principal ray or reference axis ray) passes through the origin position of the imaging optical coordinate system which is the center of the first surface R1 and the center position of the optical final imaging surface (reduction plane) is the reference axis. Also, the reference axis has a direction. The direction is a direction in which the central principal ray or the reference axis ray advances in image formation. Here, the "final imaging plane" is an imaging plane existing at the end of the optical path of the imaging optical system, and is also referred to simply as "imaging plane" or "image plane". Imaging (image capturing) is performed by disposing the image sensor IMG 0 on the final imaging plane. The final imaging plane is an optical plane, and it does not mean the image sensor directly. Therefore, "the center of the final imaging plane" does not mean "the center of the image sensor IMG 0". Accordingly, "the center of the final imaging plane" is not limited to "the center of the image sensor IMG 0". As will be described below, when there is an imaging plane forming a real image in the middle of the optical path, the imaging plane is called an "intermediate imaging plane". The expression "imaging plane" or "image plane" simply means the final imaging plane.

In each of the following embodiments, the central principal ray or the reference axis ray is refracted and reflected by each refraction surface and reflection surface while it passes through the center point (origin) of the first surface R1, which is the center of an opening of the aperture stop SP to reach the center of the final imaging plane. The order of each component surface is set to the order in which the central principal ray or the reference axis ray enters from the object side (enlargement conjugate side) to be refracted and reflected. Therefore, the reference axis eventually reaches the center of the final imaging plane while changing its direction according to the law of refraction or reflection along the set order of each surface. In each of the following embodiments, the object side (enlargement conjugate side) and the image side (reduction conjugate side) mean sides with respect to the direction of the reference axis.

In each of the embodiments, the reference axis serving as a reference of the imaging optical system is set as described above, but the way of determining the axis may be adopted in view of optical design, aberration arrangement, or expression of each surface shape constituting the imaging optical systems for convenience. Generally, it is preferred that a path of a ray that passes through the center of the image plane and either the aperture stop, the entrance pupil, the exit pupil, or the first surface R1 of the imaging optical system, or the center of the final surface is set as the reference axis.

In each of the following embodiments, each axis of the absolute coordinate system of the imaging optical system is defined as follows. That is, the Z axis is a straight line passing through the origin and the center of the object plane (a reference axis passing through the center (opening center) of the aperture stop SP (the first surface R1) from the object side), and its direction from the object plane toward the first surface R1 is a positive direction. The Y axis is a straight line that passes through the origin and forms 90 degrees in the counterclockwise direction with respect to the Z axis according to the definition of the right hand coordinate system. The X axis is a straight line passing through the origin and perpendicular to the Z axis and the Y axis, and its direction toward the deep side of the paper surface of FIG. 10 is positive.

Further, in order to express the surface shape and the tilt angle of the i-th surface constituting the optical system, understanding is easier by expressing them as follows. A local coordinate system in which the point where the reference axis intersects with the i-th surface is the origin is set. Then, in the local coordinate system, the surface shape of the surface is expressed, and the tilt angle is represented by the angle formed by the reference axis and the local coordinate system. Therefore, the surface shape of the i-th surface is represented by the following local coordinate system. That is, the z axis is a surface normal passing through the origin of the local coordinates (positive direction is illustrated in FIG. 10). The y axis is a straight line that passes through the origin of the local coordinates and that forms 90 degrees in the counterclockwise direction with respect to the z direction according to the definition of the right hand coordinate system. The x axis is a straight line that passes through the origin of the local coordinate and that is perpendicular to the yz plane, and its direction toward the deep side of the page surface of FIG. 10 is positive.

Accordingly, the tilt angle of the i-th surface in the yz plane is represented by an angle $\theta_{xi}$ (unit "deg") where the z axis of the local coordinate system forms an acute angle with respect to the reference axis and the counterclockwise direction is positive. Further, the tilt angle of the i-th surface in the xz plane is represented by an angle $\theta_{yi}$ (unit "deg") where the counterclockwise direction is positive with respect to the reference axis. Further, the tilt angle of the i-th surface in the xy plane is represented by an angle $\theta_{zi}$ (unit "deg") where the counterclockwise direction is positive with respect to the y axis. However, in general, the angle $\theta_{zi}$ corresponds to the rotation of the surface and does not exist in each of the following embodiments. FIG. 10 illustrates the correlation between these absolute coordinate systems and the local coordinate system. The direction of the arrow of each axis in FIG. 10 represents the positive and negative directions of each axis. Symbol (+) indicates the positive direction and symbol (−) indicates the negative direction. In FIG. 10, a ray obliquely incident on the absolute coordinate origin is depicted as an off-axis principal ray. When the incident angle of the off-axis principal ray on the YZ plane is ωy, the sign of the incident angle is defined so that the axial principal ray incident from the top is a negative angle and the axial principal ray incident from the bottom is a positive angle. While FIG. 10 is depicted on the YZ plane, the sign of the incident angle on the XZ plane is illustrated in FIG. 11.

Figure 11:
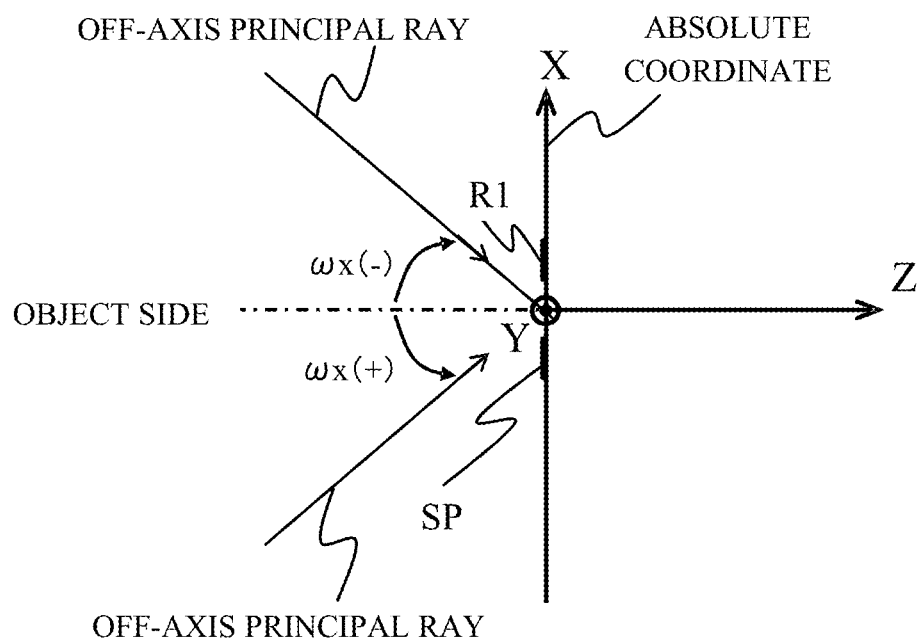
FIG. 11 is an explanatory diagram of a coordinate system in each embodiment.

FIG. 11 is a diagram obtained by rotating the coordinate system depicted in FIG. 10 in the clockwise direction around the Z axis by 90 degrees, and the direction of the Y axis from the deep side to the front side of the paper surface is positive. At this time, assuming that the incident angle of the off-axis principal ray on the XZ plane is ωx with reference to the Z axis, the sign of the incident angle is defined so that the off-axis principal ray incident from the top is a negative angle and the off-axis principal ray incident from the bottom is a positive angle. Rays located at the outermost side (positions where the incident angles ωx or ωy is maximized) among the incident angles ωx and ωy are rays that determine the maximum angle of view of the optical system on the XZ plane and the YZ plane.

2) Specific Expression of Imaging Optical System

In each embodiment, numerical data of each component surface is indicated as numerical embodiments. Symbol Di is the scalar quantity representing the distance between the origins of the local coordinates of the i-th surface and the (i+1)-th surface, symbols Ndi and vdi are the refractive index and the Abbe number of the medium between the i-th surface and the (i+1)-th surface, respectively. In each embodiment, the medium between the origins is air. Symbol E-X represents $10^{-X}$. The spherical surface has a shape represented by expression (A) below where Ri is the radius of curvature of the i-th surface and x and y are the local coordinate values of the i-th surface.

$$z = \frac{(x^2 + y^2)/R_i}{1 + \{1 - (x^2 + y^2)/R_i^2\}^{1/2}} \quad (A)$$

In addition, the imaging optical system of each of the following embodiments has two or more free-form surfaces and the shape thereof is represented by expression (B) below.

$$z = C_{02}y^2 + C_{20}x^2 + C_{03}y^3 + C_{21}x^2y + C_{04}y^4 + C_{22}x^2y^2 +$$
$$C_{40}x^4 + C_{05}y^5 + C_{23}x^2y^3 + C_{41}x^4y + C_{06}y^6 + C_{24}x^2y^4 +$$
$$C_{42}x^4y^2 + C_{60}x^6 + C_{61}x^6y + C_{43}x^4y^3 + C_{25}x^2y^5 +$$
$$C_{07}y^7 + C_{80}x^8 + C_{62}x^6y^2 + C_{44}x^4y^4 + C_{26}x^2y^6 + C_{08}y^8 \quad (B)$$

The curved surface expression represented by expression (B) includes only even-order terms with respect to x. Therefore, the curved surface defined by the curved surface expression represented by expression (B) has a plane-symmetric shape with the yz plane as a symmetry plane.

3) Appearance as Reflection Optical System

The optical system in each embodiment is based on the following idea. Conventionally, there has been a transmissive optical system using a lens in an optical system used for a vehicle-mounted camera or a surveillance camera. Various apparatuses have been proposed for sensing such as measuring a distance by obtaining stereo vision of the same two optical system horizontally or vertically or acquiring a 3D shape. Various optical systems of small size and high image quality using an imaging optical system including a free-form surface have also been proposed.

For example, in order to accurately measure a distance using a stereo optical system or to acquire a 3D shape, it is necessary to enhance imaging performance to improve image quality. In addition, in sensing applications such as distance measurement with the vehicle-mounted cameras or surveillance cameras, it is necessary to capture surroundings widely, and therefore it is necessary to widen the angle to some extent. If the system is configured by the transmission type lens optical system, an optical system with wide angle and low distortion can be assembled by increasing the number of lenses. However, since the number of parts is greatly increased, the cost increases and the size is also increased. Or, because it is necessary to suppress manufacturing errors and assembly errors, manufacturing difficulty level increases.

4) Outline of the Present Invention (Reflection Mirror Configuration Having Free-Form Surface Shape)

In each embodiment, the optical system is a hollow reflection mirror configuration (hollow mirror configuration) having a free-form surface shape. Thus, it is not necessary to increase the number of lenses for chromatic aberration correction, and it is possible to maintain a state in which the F number is bright and the imaging performance is high with a small number of parts. The hollow mirror configuration is a mirror structure in which a reflection surface is formed by depositing a material such as silver or aluminum with a high reflectance in a visible light region, and both the incident side and the exit side (reflection side) of the reflection surface are a gas medium such as air or a vacuum. As described above, in each of the embodiments, light is not propagated in a transparent solid such as a prism to be reflected by a wall surface (or a boundary with the outside) in the solid. If the prism or the like is used, chromatic aberration occurs as described above, which is not preferable.

First Embodiment

Figure 1:
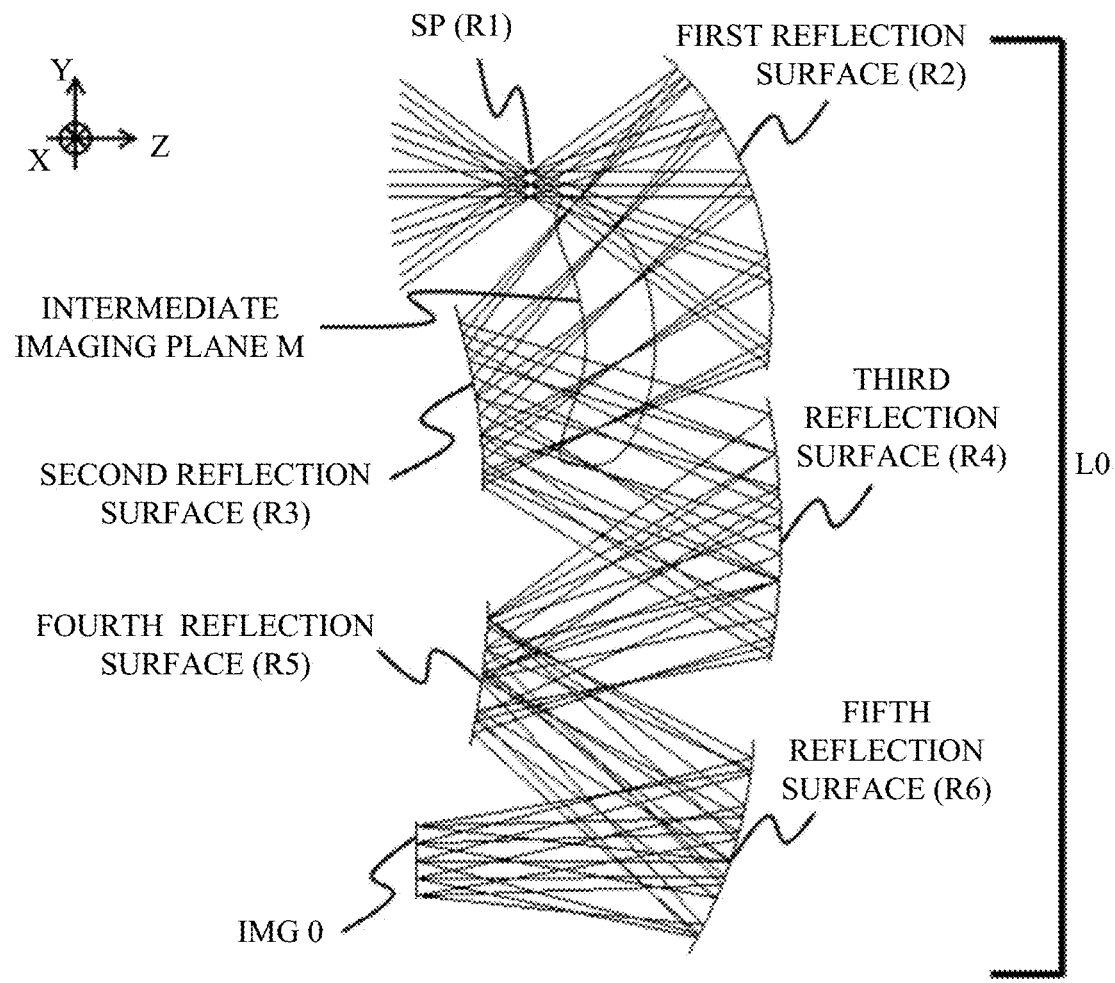
FIG. 1 is a cross-sectional view of an optical system and a schematic arrangement view of an image capturing apparatus in a first embodiment.

Next, a first embodiment of the present invention will be described. First, referring to FIG. 1, a basic configuration of an optical system (reflection optical system) L0 of this embodiment will be described. The optical system L0 is an imaging optical system including i-th surfaces Ri of five reflection surface (symbol i is a surface number given in order from the object side) and an image sensor IMG0. Further, the optical system L0 includes an aperture stop SP (first surface R1) on the most object side. In FIG. 1, the aperture stop SP, the image sensor IMG0, and the optical system L0 are illustrated. In FIG. 1, the aperture stop SP is assumed to have one optical element surface, and symbol R1 is indicated in parentheses. The final imaging plane formed by the optical system L0 is formed on the surface of one image sensor IMG0.

FIG. 1 illustrates the arrangement (YZ plane) of the optical system L0 in this embodiment. FIG. 1 illustrates a state in which light is captured from the aperture stop SP and passes through a second surface R2 to a sixth surface R6, which are reflection surfaces of the optical system L0, to form an image on the image sensor IMG0. The position of the aperture stop (opening) SP corresponds to the position of an entrance pupil of the off-axial optical system L0 composed of the second surface R2 to the sixth surface R6 which are the plurality of reflection surfaces.

In FIG. 1, each of the second surface R2 to the sixth surface R6 of the reflection surfaces constituting the optical system L0 has a free-form surface shape, and as described above, it constitutes the off-axial optical system in which the reference axis is bent. The image sensor IMG0 is disposed at the position of the final imaging plane formed by the optical system L0.

Figure 2:
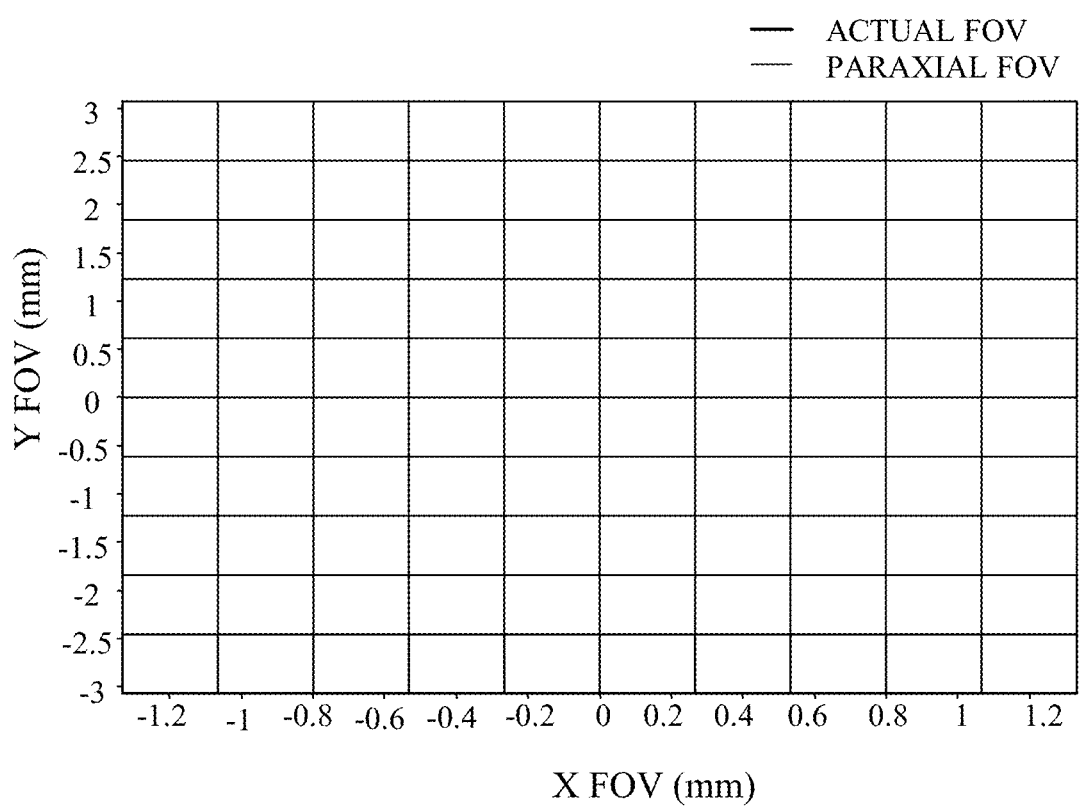
FIG. 2 is a diagram illustrating distortion of the optical system in the first embodiment.

FIG. 2 illustrates a state of distortion in this embodiment (Numerical embodiment 1). In FIG. 2, the horizontal axis represents the coordinate value (corresponding to the X angle of view) on the image plane in the X axis direction and the vertical axis represents the coordinate value (corresponding to the Y angle of view) on the image plane in the Y axis direction. Further, FIG. 2 depicts an ideal grid without distortion (Paraxial FOV) and a grid of an actual ray tracing result (Actual FOV) in an overlapping manner. In the case of an optical system having a large distortion, it is easy to understand that the grid is shifted, but since the imaging optical systems L1 and L2 of this embodiment can greatly reduce distortion, the actual grid cannot be substantially distinguished from an ideal grid.

Figure 3:
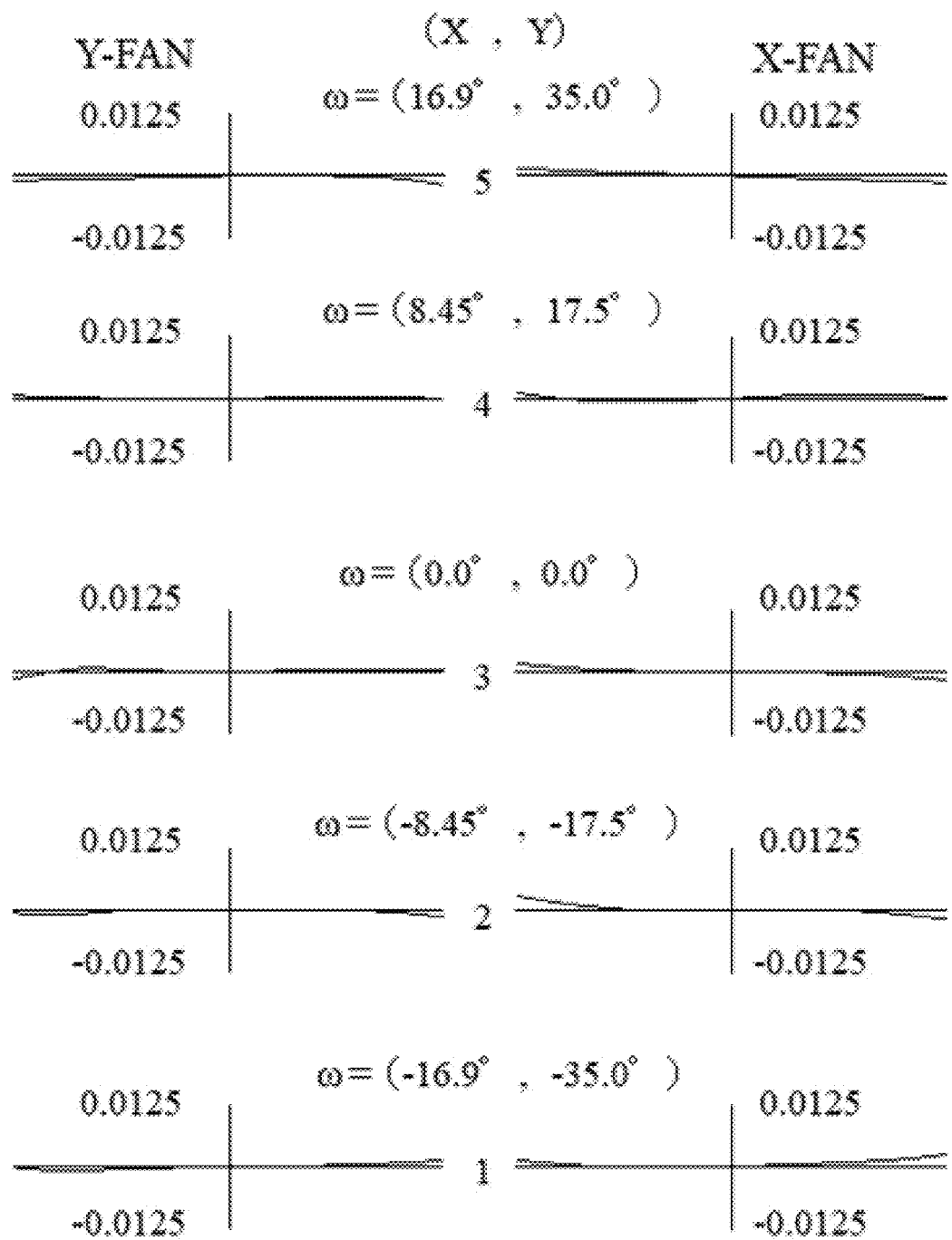
FIG. 3 is a lateral aberration diagram of the optical system in the first embodiment.
Figure 12:
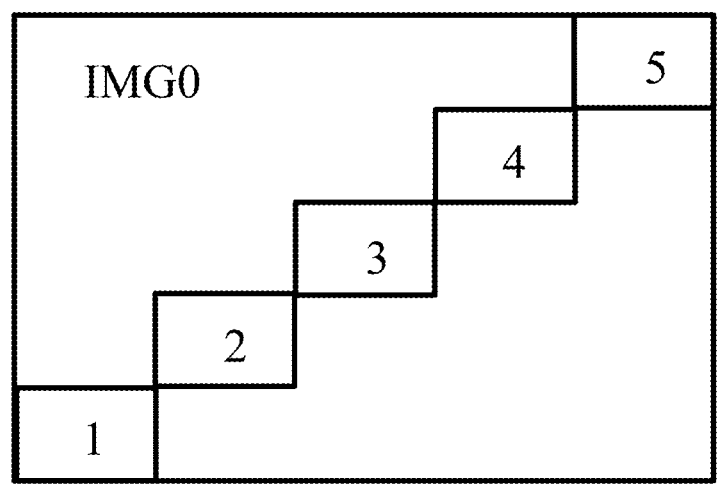
FIG. 12 is an explanatory diagram of evaluation positions of a lateral aberration in each embodiment.

FIG. 12 illustrates evaluation positions 1, 2, 3, 4, and 5 on the image sensor IMG0. FIG. 3 illustrates lateral aberration diagrams at the evaluation positions 1 to 5. In the lateral aberration diagram of FIG. 3, the horizontal axis represents the X axis or the Y axis on the pupil plane, and the vertical axis represents an amount of aberration on the image plane. The wavelength of the evaluation ray is the d line. Symbol ω denotes a half angle of view. In all aberration diagrams, when numerical embodiments to be described below are expressed in units of mm, they are depicted on a scale of lateral aberration ±0.0125 mm. In each of the embodiments after this embodiment, redundant explanations are omitted, and meanings of duplicated symbols are common unless otherwise specified.

Next, based on the configuration of this embodiment, the features and the effect of the present invention will be described. As described above, conventionally, various small-sized and wide-angle imaging optical systems have been disclosed. Further, various techniques have been disclosed that uses a reflection optical system utilizing a free-form surface mirror for an image capturing apparatus so as to achieve both miniaturization and improvement of imaging performance.

However, in the case of obtaining an image via the image capturing apparatus including the imaging optical system to acquire distance information or a 3D shape based on the image, or to recognize an object, it is necessary to acquire the image with high image quality and low distortion while maintaining a wide angle in the whole screen area. In addition, when the optical system is used in a vehicle-mounted camera or a surveillance camera, it is necessary to acquire an image even in a low illuminance environment, and therefore an optical system with a bright F number is necessary. Accordingly, by applying the optical system using the free-form surface mirror to the imaging optical system, it is possible to easily obtain the imaging optical system with a bright F number (specifically, the F number in the vicinity of the screen center of around 2.0), high image quality, and low distortion. However, when the angle of view of the reflection optical system is increased (specifically, when the whole angle of view of either X or Y exceeds 70 degrees), in particular, the first surface and the second reflection surface become large.

Figure 13:
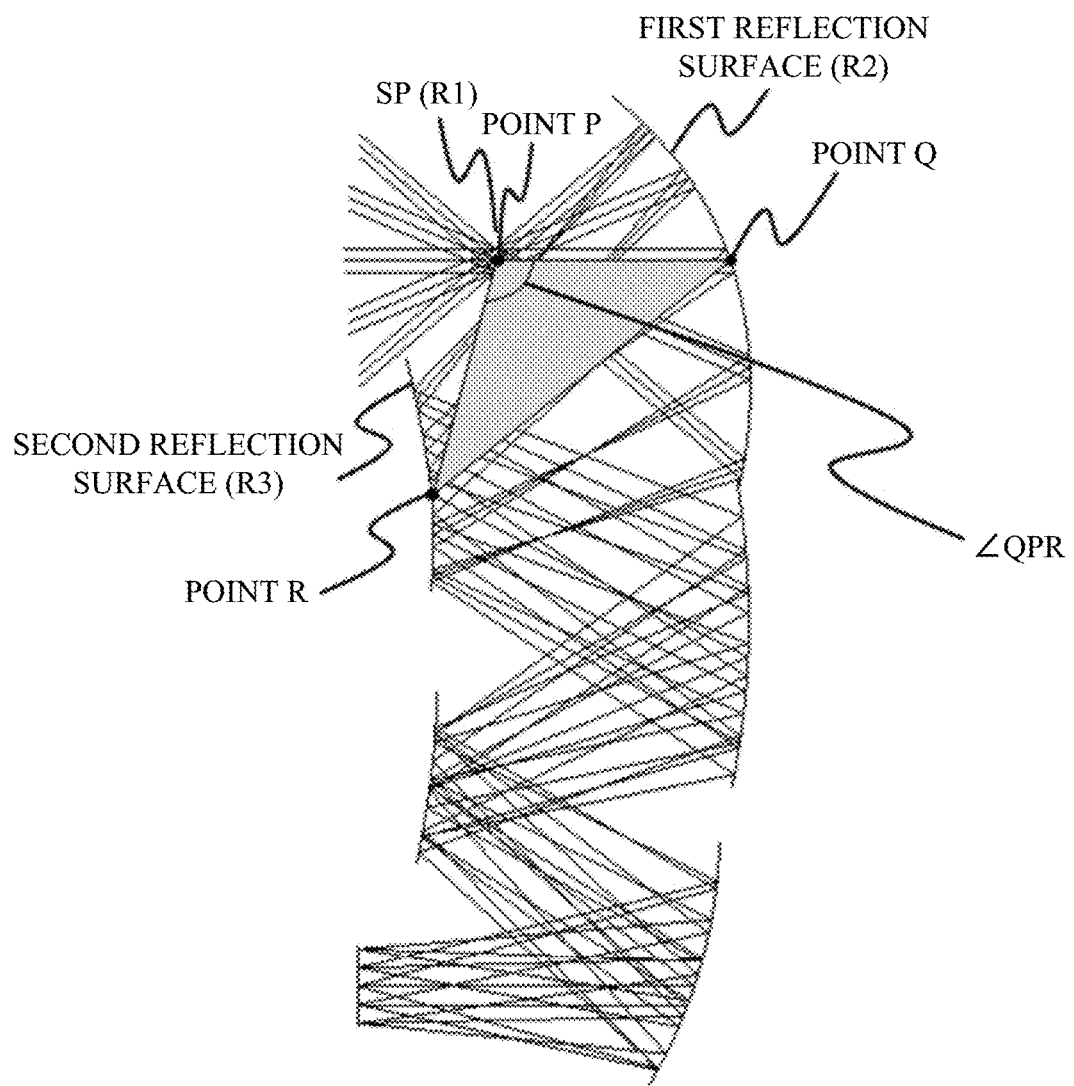
FIG. 13 is an explanatory diagram of the optical system in each embodiment.

Therefore, in this embodiment, in a triangle having apexes of the opening center of the aperture stop SP and the following points on the first surface (first reflection surface) R2 and the second surface (second reflection surface) R3, its one angle is set within a predetermined range. As a result, even if the angle of view is increased, it is possible to prevent the entire system from becoming larger. Specifically, as illustrated in FIG. 13, the optical system L0 of this embodiment includes the aperture stop SP, the reflection surface (first surface R2) having a first radius of curvature, and the reflection surface (second surface R3) having a second radius of curvature in order of the ray traveling from the object side (enlargement side) to the image side (reduction side). It is assumed that the opening center (origin) of the aperture stop SP is P, an intersection (local origin of the first surface R2) between the reference axis and the first surface R2 is Q, an intersection (local origin of the second surface R3) between the reference axis and the second surface R3 is R. An angle (deg) between a line segment PQ connecting the opening center P and the intersection Q and a line segment PR connecting the opening center P and the intersection R is defined as ∠QPR. In this case, the optical system L0 of this embodiment satisfies conditional expression (1) below.

$$95 < \angle QPR < 120 \tag{1}$$

When conditional expression (1) is satisfied, the following three effects are obtained. The first point is the effect of miniaturizing the first surface R2. In order to miniaturize the first surface R2, the interval (distance) between the aperture stop SP and the first surface R2 may be shortened. The size of the first surface R2 is almost determined only by the angle of view and the distance between the aperture stop SP and the first surface R2 (to be exact, the width of the light beam is also one factor of determination, but the contribution rate of the angle of view and the distance is high, and accordingly it may be ignored). Therefore, when the angle of view is determined first, in order to reduce the size of the first surface R2, it is only necessary to shorten the distance between the aperture stop SP and the first surface R2. However, when the distance between the aperture stop SP and the first surface R2 is too short, the aperture stop SP blocks the light beam from the first surface R2 toward the second reflection surface R3, which is not preferable. Therefore, it is preferred that the distance between the aperture stop SP and the first surface R2 is shortened.

The second point is the effect of miniaturizing the second reflection surface R3. In order to miniaturize the second reflection surface R3, it is necessary to form the shape of the first surface R2 to be a concave surface. Conversely, if the shape of the first surface R2 is a convex surface, a reflected ray from the first surface R2 diverges and the second reflection surface R3 becomes huge, which is not preferable. Further, if the first surface R2 is a concave surface, each of the angle-of-view light beams converges so that each of the angle-of-view light beams converges so as to be collected at one point while an intermediate imaging plane (intermediate image) is formed. Therefore, by separating the distance between the first surface R2 and the second reflection surface R3 by a certain distance, the size of the second reflection surface R3 can be reduced. However, if the distance between the first surface R2 and the second reflection surface R3 is too large, it is not preferable because the size increases in the Z axis direction.

The third point is the effect of reducing an eccentric aberration occurring on the first surface R2. When the light incident from the aperture stop SP is reflected by the first surface R2 to be emitted toward the second reflection surface R3, if the reflection angle on the first surface R2 is reduced, it is possible to reduce the asymmetric aberration (eccentric aberration) occurring for each angle-of-view light beam. Therefore, it is preferred that the tilt angle of the first surface R2 is reduced and the second reflection surface R3 comes closer to the Z axis. However, if the second reflection surface R3 comes too close to the Z axis, it is not preferable because an outermost angle-of-view ray incident on the aperture stop SP is blocked by the second reflection surface R3. Thus, it is preferred that conditional expression (1) is satisfied because the above three effects (miniaturization and improvement of image quality) can be achieved.

More preferably, conditional expression (1) satisfies conditional expression (1a) below.

$$95 < \angle QPR < 110 \quad (1a)$$

More preferably, conditional expression (1a) satisfies conditional expression (1b).

$$97 < \angle QPR < 110 \quad (1b)$$

The optical system L0 of this embodiment is configured as described above, and more preferably it satisfies at least one of the following conditions. According to this, it is possible to provide the optical system capable of reducing an aberration such as distortion that is different for each image height while simultaneously achieving both the wide-angle configuration and reduction in size.

In order to bend the reference axis, the optical system L0 includes two or more reflection surfaces each having a free-form surface shape. By including such reflection surfaces, it is possible to easily perform aberration correction to improve imaging performance. The optical system L0 has a configuration in which the position of the aperture stop SP disposed on the first surface R1 is the entrance pupil position. As a result, even when the angle of view is increased, each reflection surface does not become large. In addition, since the incident light and the reflected light on each reflection surface can share the same space, it is possible to effectively use the space to reduce the size of each reflection surface. Even if the position of the entrance pupil does not strictly located on the position of the aperture stop SP due to manufacturing errors or the like, the effect of the present invention can be obtained, and accordingly some deviation is permitted.

The optical system L0 of this embodiment has an angle of view of ±35 degrees around the Z axis in the YZ plane and has an angle of view of ±16.9 degrees around the Z axis in the XZ plane. Further, the reflection surface of the second surface R2 is a first reflection surface, and the following reflection surface is a second reflection surface, a third reflection surface, and the like, along the reference axis, in order from the object side (enlargement conjugate side), and thus it is assumed that numbers are assigned to the reflecting surfaces each having the free-form surface shape. In this case, in order to achieve high image quality over the entire screen (image) while maintaining this angle of view, the first reflection surface has a deep concave shape having a positive power. The area of the first reflection surface is larger than the area of the second reflection surface. The area of the first reflection surface is the largest among the reflection surfaces included in the optical system L0.

In this embodiment, the intermediate imaging plane M is provided between the first surface R2 and the final reflection surface with respect to all angle-of-view light beams. The final reflection surface is a reflection surface where the ray is reflected immediately before it is incident on the optical imaging plane of the optical system L0. In each embodiment, the fifth reflection surface R6 corresponds to the final reflection surface. By forming the intermediate imaging plane M, it is possible to collect rays of peripheral angle of view with respect to the light beams after the intermediate imaging plane M in the vicinity of the reference axis even in the imaging optical system having a wide angle of view, and accordingly the area of the reflection surface can be reduced, which is preferable.

More preferably, at least one light beam forms an intermediate imaging point (intermediate image) between the reflection surface closest to the object side (enlargement conjugate side) and the adjacent reflection surface along the reference axis among the plurality of reflection surfaces each having the free-form surface shape. In the case of the imaging optical system having a wide angle of view, the wideness of the angle of view is greatly related as a parameter for determining the size of the first surface R2. When the ray is guided to the second surface R3 so as not to form the intermediate image, the second surface R3 also becomes very large. On the other hand, when the intermediate imaging point is formed between the first surface R2 and the second surface R3, it is possible to collect rays of each angle of view in a narrow space even at a wide angle of view, so that the sizes of the second surface R3 and subsequent surfaces can be reduced, which is preferable. In this embodiment, the intermediate imaging point is formed between the first surface R2 and the second surface R3 for all angle-of-view light beams. Further, it is preferred that the intermediate imaging plane M is provided between the first surface R2 and the second surface R3. By providing the intermediate imaging plane M where intermediate imaging is performed for not only one angle-of-view ray but all angle-of-view rays, it is possible to collect all off-axis principal rays reflected on the first face R2 near the ray on the reference axis. Therefore, it is possible to reduce the size of the reflection surface of the second surface R3 while shortening the distance between the first surface R2 and the second surface R3. As a result, miniaturization of each reflection surface can be achieved even with a wide angle of view of 35 degrees or more. The position of the intermediate imaging plane M is not limited to the position illustrated in FIG. 1. Similarly, in other embodiments to be described below, the intermediate imaging plane M is formed in the optical system L0.

Preferably, the optical system L0 of this embodiment has a hollow reflection mirror configuration (hollow mirror configuration) having a free-form surface shape. Thus, it is not necessary to increase the number of lenses for chromatic aberration correction, and it is possible to maintain a state in which the F number is bright and the imaging performance is high with a small number of parts.

Preferably, in the YZ plane, the reflection surfaces each having the free-form surface shape are configured so that a reflection direction of a ray on an even-numbered reflection surface and a reflection direction of the ray at odd-numbered reflection surface are opposite to each other when seen in a traveling direction of the ray. The opposite direction is not limited to a case where the reflection directions are mutually different by 180 degrees. For example, in the case of the optical system L0 of this embodiment, the ray is reflected on the first surface R2 in the right direction along the reference axis after incidence of the ray, while it is reflected on the second surface R3 in the left direction. Thus, it is easy to cancel the eccentric aberration occurring at each reflection surface, and high image quality can be achieved over the entire screen.

In this embodiment, a plane where the reference axis repeats reflection, that is, a plane (YZ plane) including a bent reference axis is called an off-axial cross section (off-axial cross section). In the optical system L0, the half angle of view on the off-axial cross section is ωy (angle of view in the Y axis direction), the half angle of view on the cross section perpendicular to the off-axial cross section is ωx (angle of view in the X axis direction). In this case, conditional expression (2) below is satisfied, and it is preferred that ωy is 35 degrees or more.

$$\omega y > \omega x \quad (2)$$

This makes it possible to miniaturize the optical system L0 in the off-axial cross section and its vertical direction. This is useful when there is no need to see the same range in the horizontal direction and the vertical direction depending on the application of the optical system L0. For example, in the case where the use of the optical system L0 is a vehicle-mounted camera, when monitoring surroundings, it is preferable to see a wide range in the horizontal direction such as sidewalks and oncoming vehicles, but a range in the vertical direction is at least as long as traffic lights and road signs are visible, and accordingly there is no problem even if the viewing range in the vertical direction is narrower than the viewing range in the horizontal direction. In such a case, further miniaturization can be achieved by satisfying conditional expression (2) and setting the Y angle of view as the horizontal angle of view.

According to this embodiment, it is possible to provide the optical system capable of reducing an aberration such as distortion that is different for each image height while simultaneously achieving both the wide-angle configuration and reduction in size.

Second Embodiment

Figure 4:
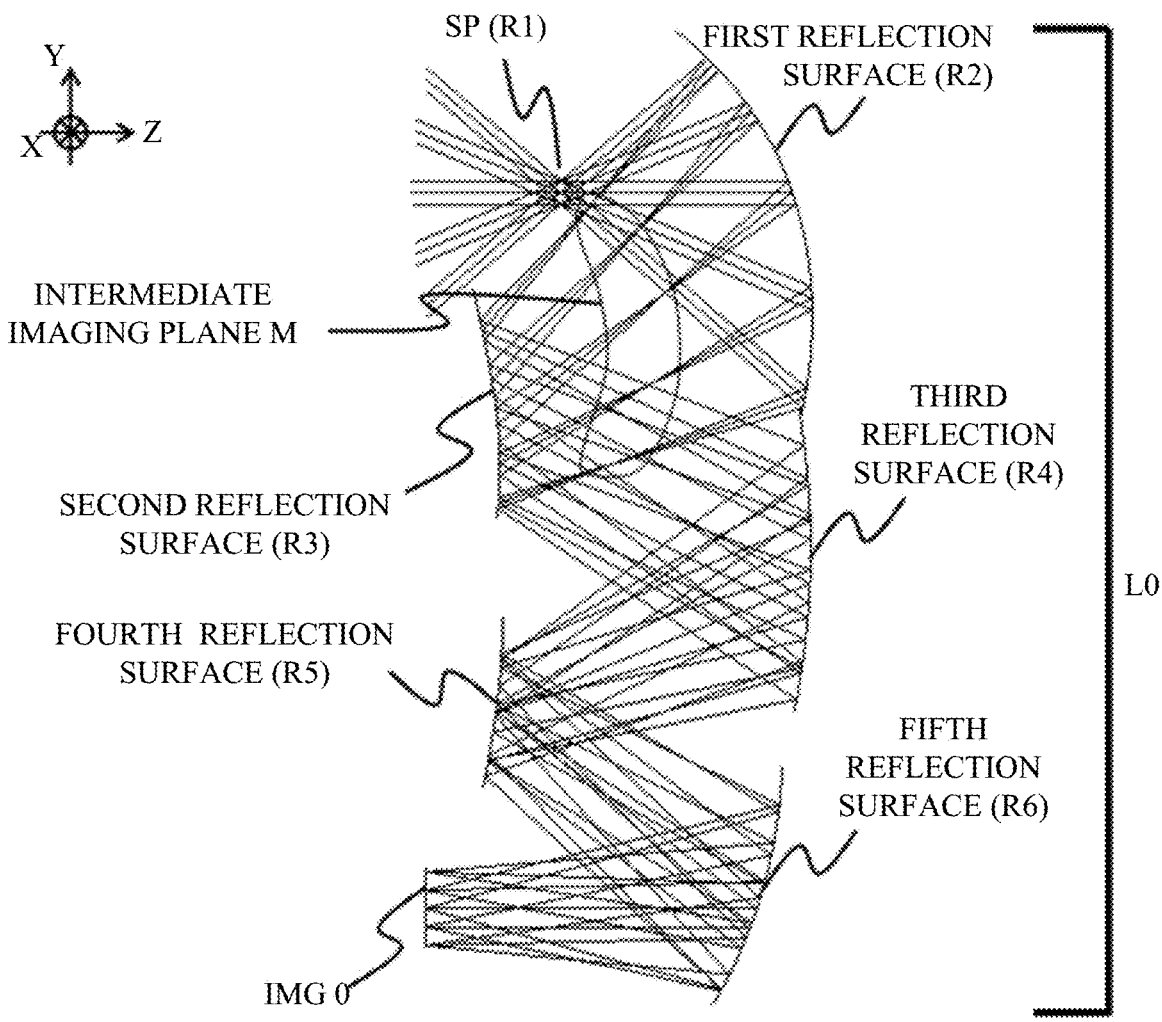
FIG. 4 is a cross-sectional view of the optical system and a schematic arrangement view of an image capturing apparatus in a second embodiment.

Next, a second embodiment of the present invention will be described. Referring to FIG. 4, a basic configuration of the optical system L0 of this embodiment will be described. FIG. 4 illustrates the arrangement (YZ plane) of the optical system L0 in this embodiment. The optical system L0 of this embodiment is different from that of the first embodiment in that it has an angle of view of ±40 degrees around the Z axis in the YZ plane and has an angle of view of ±20 degrees around the Z axis in the XZ plane.

Figure 5:
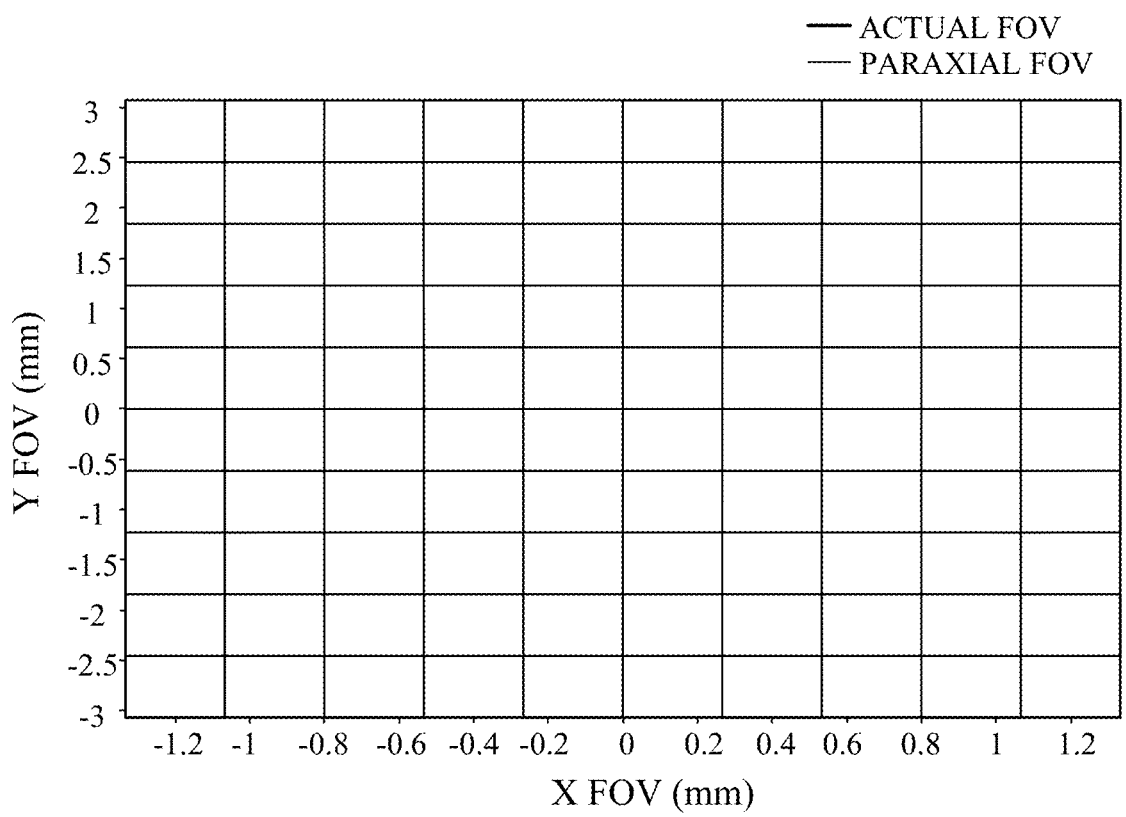
FIG. 5 is a diagram illustrating distortion of the optical system in the second embodiment.
Figure 6:
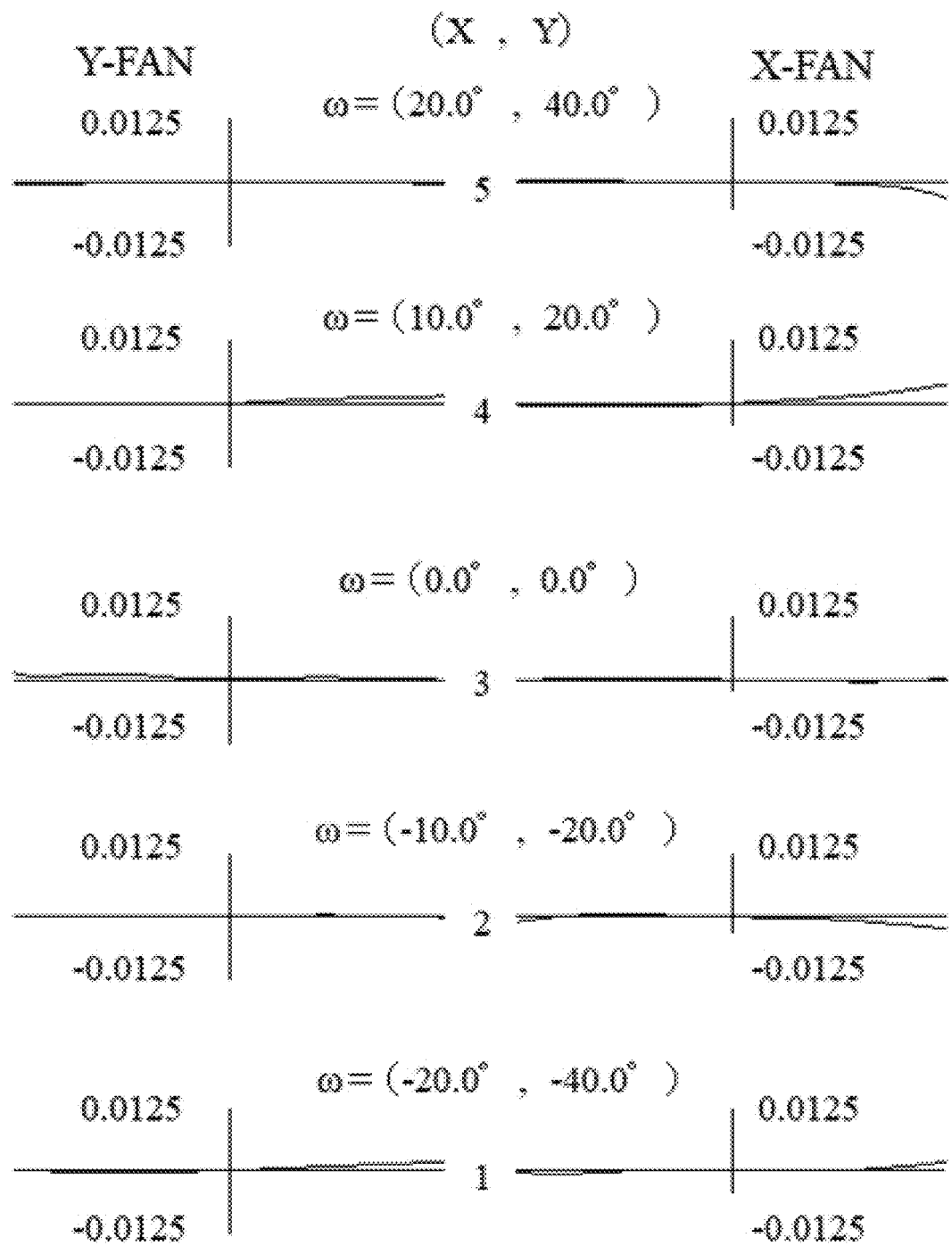
FIG. 6 is a lateral aberration diagram of the optical system in the second embodiment.

FIG. 5 illustrates a state of distortion in this embodiment (Numerical Embodiment 2). In FIG. 5, the horizontal axis represents a coordinate value on the image plane in the X axis direction (corresponding to the X angle of view) and the vertical axis represents a coordinate value on the image plane in the Y axis direction (corresponding to the Y angle of view). Further, FIG. 5 depicts an ideal grid without distortion (Paraxial FOV) and a grid of an actual ray tracing result (Actual FOV) in an overlapping manner. FIG. 6 illustrates lateral aberration diagrams at evaluation positions 1 to 5. Also, in the lateral aberration diagram of FIG. 6, the horizontal axis represents the X axis or the Y axis on the pupil plane, and the vertical axis represents an aberration amount on the image plane. The wavelength of the evaluation ray is the d line. Symbol ω is a half angle of view. In all aberration diagrams, when each of numerical embodiments to be described below is expressed in units of mm, they are depicted on a scale of lateral aberration±0.0125 mm.

According to this embodiment, it is possible to provide the optical system capable of reducing an aberration such as distortion that is different for each image height while simultaneously achieving both the wide-angle configuration and reduction in size.

Third Embodiment

Next, a third embodiment of the present invention will be described.

Figure 7:
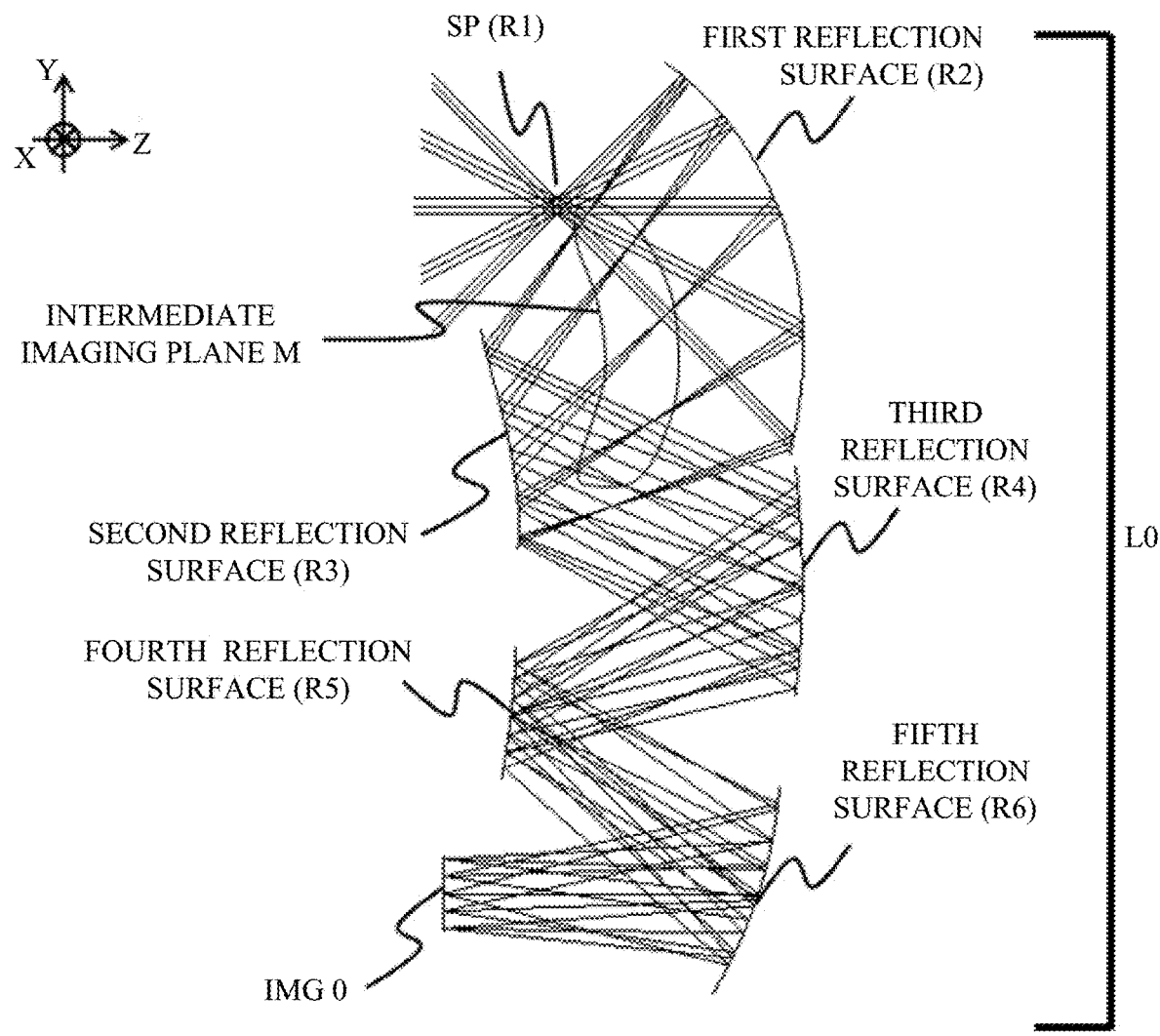
FIG. 7 is a cross-sectional view of the optical system and a schematic arrangement view of an image capturing apparatus in a third embodiment.

Referring to FIG. 7, a basic configuration of the optical system L0 of this embodiment will be described. FIG. 7 illustrates the arrangement (YZ plane) of the optical system L0 in this embodiment. The optical system L0 of this embodiment is different from that of the first embodiment in that it has an angle of view of ±45 degrees around the Z axis in the YZ plane and has an angle of view of ±23.4 degrees around the Z axis in the XZ plane.

Figure 8:
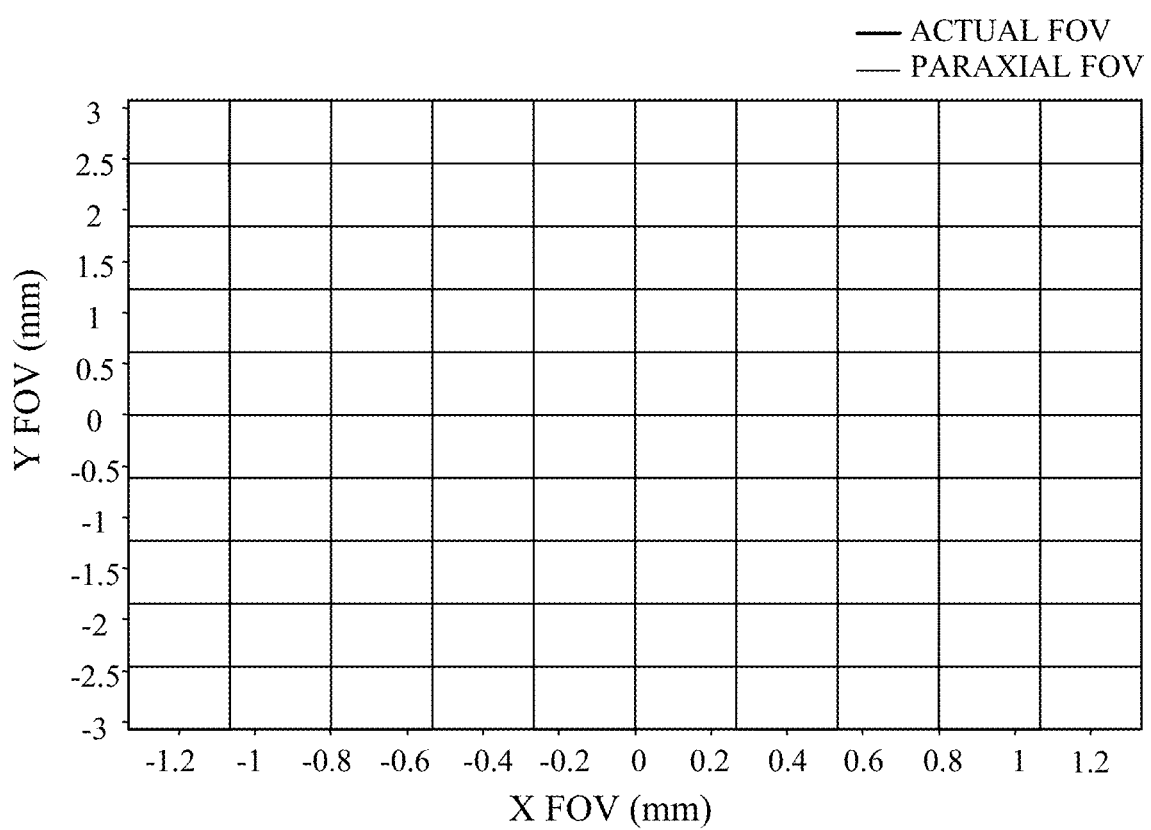
FIG. 8 is a diagram illustrating distortion of the optical system in the third embodiment.
Figure 9:
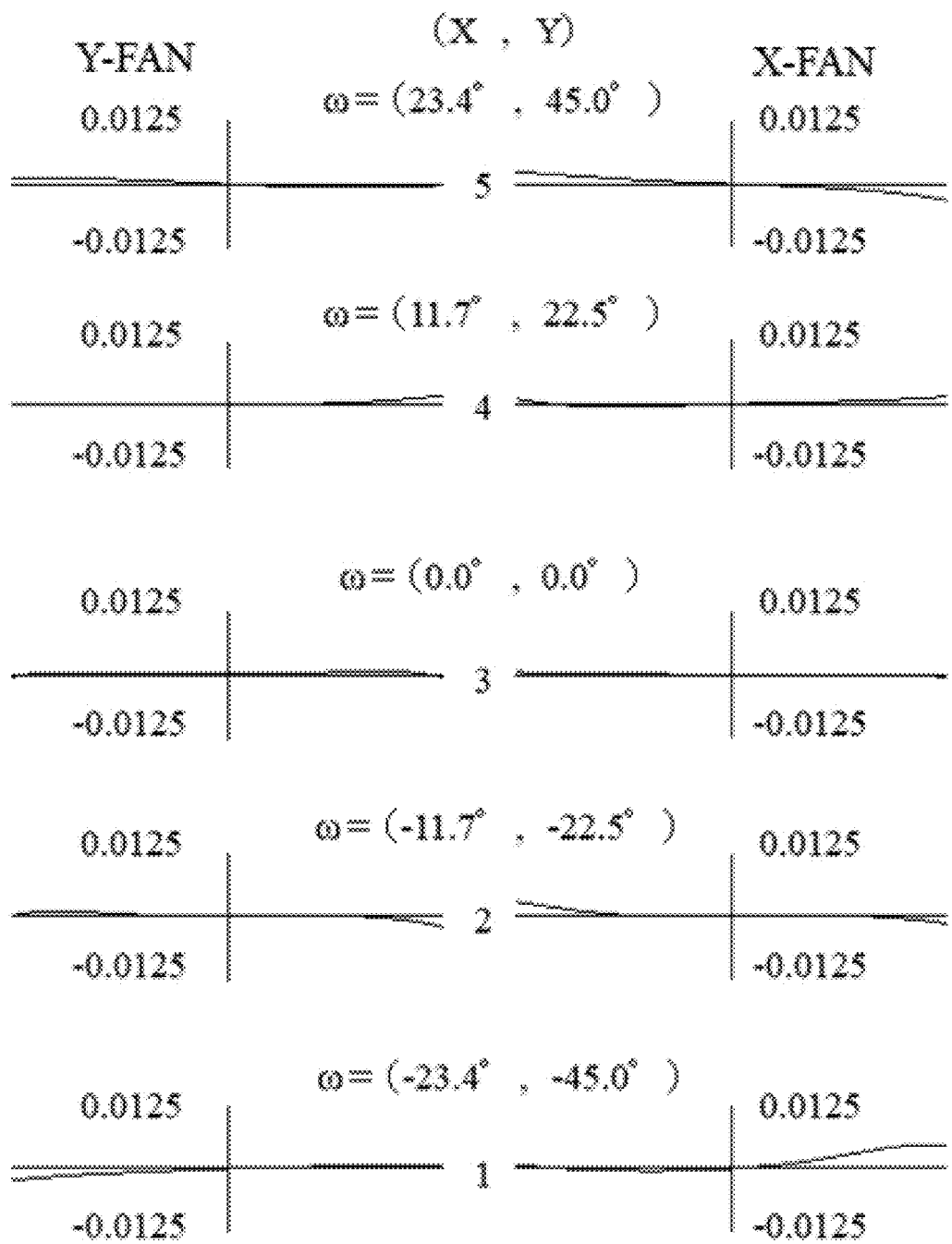
FIG. 9 is a lateral aberration diagram of the optical system in the third embodiment.

FIG. 8 illustrates a state of distortion in this embodiment (Numerical Embodiment 2). In FIG. 8, the horizontal axis represents a coordinate value on the image plane in the X axis direction (corresponding to the X angle of view) and the vertical axis represents a coordinate value on the image plane in the Y axis direction (corresponding to the Y angle of view). Further, FIG. 8 depicts an ideal grid without distortion (Paraxial FOV) and a grid of an actual ray tracing result (Actual FOV) in an overlapping manner. FIG. 9 illustrates lateral aberration diagrams at evaluation positions 1 to 5. Also, in the lateral aberration diagram of FIG. 9, the horizontal axis represents the X axis or the Y axis on the pupil plane, and the vertical axis represents an aberration amount on the image plane. The wavelength of the evaluation ray is the d line. Symbol ω denotes a half angle of view. In all aberration diagrams, when each of numerical embodiments to be described below is expressed in units of mm, they are depicted on a scale of lateral aberration±0.0125 mm.

According to this embodiment, it is possible to provide the optical system capable of reducing an aberration such as distortion that is different for each image height while simultaneously achieving both the wide-angle configuration and reduction in size.

In each embodiment, as a modified example, a cover glass may be disposed in front of and behind the aperture stop SP so that dust or the like does not enter the interior of the stereo optical system L0. Also, various filters such as a low-pass filter and a wavelength selection filter, or a cover glass may be disposed on the object side (enlargement conjugate side) relative to the image sensor IMG0. Numerical embodiments 1 to 3 corresponding to the first to third embodiments, respectively, are indicated below.

Numerical Embodiment 1

The distance from the object plane to the aperture stop SP is infinite, and the angle of view is X: ±16.9 degrees and Y: ±35.0 degrees. The focal length is X: 4.39 mm, and Y: 4.39 mm. The image plane size is x: 2.665 mm, and y: 6.144 mm. The entrance pupil (aperture stop SP) is circular and its diameter is 2.2 mm. The F number for an on-axis light beam is 2.00 in the X axis direction and 1.99 in the Y axis direction. The on-axis light beam is a light beam incident on the center of the imaging plane (light receiving surface) of the image sensor. That is, the on-axis light beam includes the reference ray. In other words, the reference ray corresponds to the principal ray (on-axis ray) of the on-axis light beam. The power (focal length) of each reflection surface in each numerical embodiment indicates a power (focal length) of each reflection surface for the on-axis light beam. In other words, the power of each reflection surface indicates a power at the position on each reflection surface where the on-axis light beam passes. The reflection surfaces of this embodiment are all composed of free-form surfaces, and they have rectangular shapes when they are projected on the XZ plane. The free-form surface shape is given by expression (B).

| Surface data | | | | | | |
|---|---|---|---|---|---|---|
| Surface Number | Xi | Yi | Zi | Di | θxi | θyi |
| 1(SP) | 0.00 | 0.00 | 0.00 | 19.50 | 0.00 | 0.00 Aperture stop (P) |
| 2(R2) | 0.00 | 0.00 | 19.50 | 31.50 | 20.06 | 0.00 First reflection surface (Q) |
| 3(R3) | 0.00 | −20.30 | −4.59 | 29.50 | −32.39 | 0.00 Second reflection surface (R) |
| 4(R4) | 0.00 | −32.61 | 22.22 | 28.50 | 23.25 | 0.00 Third reflection surface |
| 5(R5) | 0.00 | −43.21 | −4.23 | 27.50 | −29.34 | 0.00 Fourth reflection surface |
| 6(R6) | 0.00 | −59.70 | 17.78 | 27.90 | 18.42 | 0.00 Fifth reflection surface |
| Image plane | 0.00 | −59.70 | −10.12 | | 0.00 | 0.00 IMG0 |

On the YZ plane
Coordinate of point P: (Z, Y) = (0, 0)
Coordinate of point Q: (Z, Y) = (19.5, 0)
Coordinate of point R: (Z, Y) = (−4.59, −20.30)
Accordingly, angle QPR (∠QPR) = 102.73 degrees

Free-form surface data

Second surface (R2): First reflection surface

$C20 = -1.4847E-02$    $C02 = -1.6783E-02$    $C21 = -4.1350E-05$
$C03 = -5.8521E-05$    $C40 = -4.6230E-06$    $C22 = -5.5233E-06$
$C04 = -2.3544E-06$    $C41 = -6.0173E-08$    $C23 = 1.6024E-08$
$C05 = 1.5496E-09$     $C60 = 5.8601E-08$     $C42 = -3.2293E-09$
$C24 = -4.4562E-09$    $C06 = -1.0096E-09$    $C60 = -1.6718E-09$
$C43 = -1.1855E-09$    $C25 = -2.9020E-10$    $C07 = -1.7441E-11$
$C80 = -6.3113E-10$    $C62 = -9.5298E-11$    $C44 = -4.9974E-11$
$C26 = -5.8622E-12$    $C08 = -6.2360E-13$

Third surface (R3): Second reflection surface

$C20 = -2.2454E-02$    $C02 = -1.1495E-02$    $C21 = 3.8945E-04$
$C03 = 3.0657E-04$     $C40 = 2.3488E-05$     $C22 = 6.2431E-06$
$C04 = 5.0360E-06$     $C41 = -4.9124E-07$    $C23 = -1.1334E-06$
$C05 = -5.2928E-07$    $C60 = 1.3174E-07$     $C42 = 4.9774E-08$
$C24 = 1.5413E-07$     $C06 = 3.9554E-08$     $C60 = 4.1917E-09$
$C43 = -1.5030E-10$    $C25 = -5.0084E-09$    $C07 = -1.5464E-09$
$C80 = -6.5087E-09$    $C62 = -8.2913E-10$    $C44 = -8.1950E-10$
$C26 = -1.7067E-10$    $C08 = 7.2010E-12$

Fourth surface (R4): Third reflection surface

$C20 = -1.4283E-02$    $C02 = -7.9537E-03$    $C21 = 1.5699E-05$
$C03 = 1.8987E-05$     $C40 = -2.9488E-06$    $C22 = -3.4117E-06$
$C04 = -9.0232E-07$    $C41 = 4.1836E-09$     $C23 = 1.9611E-10$
$C05 = -1.2034E-08$    $C60 = -1.0629E-09$    $C42 = -1.8933E-09$
$C24 = -3.0439E-10$    $C06 = -6.2336E-11$    $C60 = 2.3359E-11$
$C43 = 1.3252E-11$     $C25 = -8.9922E-13$    $C07 = -4.4635E-12$
$C80 = -1.7502E-12$    $C62 = -2.6360E-12$    $C44 = -2.6584E-12$
$C26 = -6.6980E-13$    $C08 = -8.5529E-14$

Fifth surface (R5): Fourth reflection surface

$C20 = -6.9546E-02$    $C02 = -7.0130E-03$    $C21 = -7.9528E-05$
$C03 = -6.1095E-05$    $C40 = -4.9306E-04$    $C22 = -1.1677E-04$
$C04 = -9.9848E-06$    $C41 = -1.0778E-05$    $C23 = -2.1794E-06$
$C05 = -1.9536E-07$    $C60 = -9.7639E-06$    $C42 = -2.8303E-06$
$C24 = -7.2772E-08$    $C06 = -3.1843E-09$    $C60 = 2.4989E-07$
$C43 = -2.0907E-07$    $C25 = -4.2851E-08$    $C07 = -1.6888E-09$
$C80 = -4.1440E-07$    $C62 = -1.3143E-07$    $C44 = -3.4457E-08$
$C26 = -4.2990E-09$    $C08 = -1.5217E-10$

Sixth surface (R6): Fifth reflection surface

$C20 = -1.7226E-02$    $C02 = -1.1635E-02$    $C21 = 3.3064E-05$
$C03 = 5.3845E-06$     $C40 = -5.2524E-06$    $C22 = -7.3041E-06$
$C04 = -2.1896E-06$    $C41 = 3.7005E-08$     $C23 = 4.8340E-08$
$C05 = 5.6947E-09$     $C60 = -3.1679E-09$    $C42 = -7.4372E-09$
$C24 = -3.8016E-09$    $C06 = -1.5773E-09$    $C60 = 6.3978E-11$

-continued

| | | |
|---|---|---|
| C43 = −9.8550E−12 | C25 = −1.1304E−10 | C07 = −1.8788E−11 |
| C80 = −3.8083E−12 | C62 = −6.0111E−12 | C44 = −2.3474E−12 |
| C26 = 4.7502E−12 | C08 = 6.5213E−12 | |

Focal length data of each reflection surface for the on-axis light beam
Symbol i of fix and fiy corresponds to the i-th reflection surface.
Symbol fix represents the focal length on the X cross section, and symbol fiy represents the focal length on the Y cross section.
Symbol fx is the focal length of the entire system on the X cross section, and symbol fy is the focal length of the entire system on the Y cross section.

| | |
|---|---|
| f1x = 17.926 mm | f1y = 13.993 mm |
| f2x = −13.185 mm | f2y = −18.365 mm |
| f3x = 19.050 mm | f3y = 28.880 mm |
| f4x = −4.124 mm | f4y = −31.076 mm |
| f5x = 15.296 mm | f5y = 20.386 mm |
| fx = 4.388 mm | fy = 4.387 mm |

Shape Data of Each Reflection Surface

Since it has a rectangular shape, twice the value of each of Eaix and Eaiy corresponds to the length of the side of the rectangle. The longer of the lengths of each side is called a "long side" and the shorter side is called a "short side". This also applies to subsequent numerical embodiments.
Symbol i of Eaix and Eaiy corresponds to the i-th reflection surface.
Symbol Eaix is half the length of the side on the X cross section, and symbol Eaiy is half the length of the side on the Y cross section.

| | |
|---|---|
| Ea1x = 7.34 mm | Ea1y = 13.66 mm |
| Ea2x = 5.69 mm | Ea2y = 7.30 mm |
| Ea3x = 17.54 mm | Ea3y = 10.70 mm |
| Ea4x = 3.05 mm | Ea4y = 5.41 mm |
| Ea5x = 11.50 mm | Ea5y = 8.90 mm |

-continued $\omega_x = \pm 16.9$ degrees
$\omega_y = \pm 35.0$ degrees

Numerical Embodiment 2

The distance from the object plane to the aperture stop SP is infinite, and the angle of view is X: ±20.0 degrees and Y: ±40.0 degrees. The focal length is X: 3.66 mm, and Y: 3.66 mm. The image plane size is x: 2.665 mm, and y: 6.144 mm. The entrance pupil (aperture stop SP) is circular and its diameter is 1.93 mm. The F number for the on-axis light beam is 1.90 in the X axis direction and 1.90 in the Y axis direction. The reflection surfaces of this embodiment are all composed of free-form surfaces, and they have rectangular shapes when they are projected on the XZ plane. The free-form surface shape is given by expression (B).

Surface data

| Surface | Xi | Yi | Zi | Di | θxi | θyi | |
|---|---|---|---|---|---|---|---|
| 1(SP) | 0.00 | 0.00 | 0.00 | 19.50 | 0.00 | 0.00 | Aperture stop (P) |
| 2(R2) | 0.00 | 0.00 | 19.50 | 31.50 | 19.00 | 0.00 | First reflection surface (Q) |
| 3(R3) | 0.00 | −19.39 | −5.32 | 29.50 | −32.50 | 0.00 | Second reflection surface (R) |
| 4(R4) | 0.00 | −32.79 | 20.96 | 28.50 | 24.50 | 0.00 | Third reflection surface |
| 5(R5) | 0.00 | −43.46 | −5.46 | 27.50 | −29.50 | 0.00 | Fourth reflection surface |
| 6(R6) | 0.00 | −60.01 | 16.50 | 27.90 | 18.50 | 0.00 | Fifth reflection surface |
| Image Plane | 0.00 | −60.01 | −11.40 | | 0.00 | 0.00 | IMG0 |

On the YZ plane
Coordinate of point P: (Z, Y) = (0, 0)
Coordinate of point Q: (Z, Y) = (19.5, 0)
Coordinate of point R: (Z, Y) = (−5.32, −19.39)
Accordingly, angle QPR (∠QPR) = 105.35 degrees Free-form surface data Second surface (R2): First reflection surface

| | | |
|---|---|---|
| C20 = −1.6644E−02 | C02 = −1.7099E−02 | C21 = −3.7174E−05 |
| C03 = −6.7259E−05 | C40 = −5.9650E−06 | C22 = −5.1984E−06 |
| C04 = −2.6451E−06 | C41 = 1.0825E−07 | C23 = −1.9334E−08 |
| C05 = −1.5673E−09 | C60 = 4.5002E−08 | C42 = 4.9278E−09 |
| C24 = −2.8827E−09 | C06 = −1.0893E−09 | C60 = −5.9897E−10 |
| C43 = 1.2658E−11 | C25 = −7.6124E−11 | C07 = −2.2000E−11 |
| C80 = −3.0578E−10 | C62 = −4.4718E−11 | C44 = −5.7163E−12 |
| C26 = −3.7996E−12 | C08 = −7.0286E−13 | |

Third surface (R3): Second reflection surface

| | | |
|---|---|---|
| C20 = −2.2656E−02 | C02 = −1.1670E−02 | C21 = 1.7920E−04 |
| C03 = 3.3144E−04 | C40 = 2.6431E−05 | C22 = 1.5695E−05 |

-continued

| | | |
|---|---|---|
| C04 = 5.1364E−06 | C41 = −5.5838E−06 | C23 = −9.8032E−07 |
| C05 = −5.6099E−07 | C60 = −3.5854E−07 | C42 = 7.0674E−08 |
| C24 = 6.4581E−08 | C06 = 3.7987E−08 | C60 = 3.4014E−08 |
| C43 = −1.7157E−08 | C25 = −5.0583E−09 | C07 = −2.1047E−09 |
| C80 = −7.0103E−10 | C62 = 6.0602E−10 | C44 = 1.2289E−09 |
| C26 = 1.7349E−10 | C08 = 6.2989E−11 | |

Fourth surface (R4): Third reflection surface

| | | |
|---|---|---|
| C20 = −1.4558E−02 | C02 = −7.1439E−03 | C21 = 1.2958E−05 |
| C03 = 7.6386E−06 | C40 = −3.1650E−06 | C22 = −3.1525E−06 |
| C04 = −8.1294E−07 | C41 = −2.5194E−08 | C23 = −1.5689E−09 |
| C05 = −1.8696E−08 | C60 = −1.6023E−09 | C42 = −1.3623E−09 |
| C24 = −4.8314E−10 | C06 = −2.5898E−11 | C60 = 4.1426E−11 |
| C43 = −1.3412E−11 | C25 = −2.5224E−11 | C07 = −7.6565E−12 |
| C80 = −1.6125E−12 | C62 = −2.6735E−12 | C44 = −9.2673E−13 |
| C26 = 1.0376E−12 | C08 = 5.9877E−13 | |

Fifth surface (R5): Fourth reflection surface

| | | |
|---|---|---|
| C20 = −7.5751E−02 | C02 = −6.4204E−03 | C21 = −1.1052E−04 |
| C03 = −1.3762E−04 | C40 = −6.8899E−04 | C22 = −1.3013E−04 |
| C04 = −1.0185E−05 | C41 = −4.6415E−05 | C23 = −2.9804E−06 |
| C05 = −2.7355E−07 | C60 = −2.6485E−05 | C42 = −7.0867E−07 |
| C24 = −3.4204E−07 | C06 = 3.1729E−09 | C60 = 3.5636E−06 |
| C43 = −7.7732E−07 | C25 = −1.0325E−07 | C07 = −3.6129E−09 |
| C80 = −1.2775E−07 | C62 = −6.2294E−07 | C44 = −3.8090E−08 |
| C26 = −7.0588E−09 | C08 = −5.3924E−10 | |

Sixth surface (R6): Fifth reflection surface

| | | |
|---|---|---|
| C20 = −1.7328E−02 | C02 = −1.1851E−02 | C21 = 3.2912E−05 |
| C03 = 2.9059E−07 | C40 = −5.4007E−06 | C22 = −7.5346E−06 |
| C04 = −2.1278E−06 | C41 = 4.6282E−08 | C23 = 2.2338E−08 |
| C05 = −1.6590E−09 | C60 = −4.1567E−09 | C42 = −9.1879E−09 |
| C24 = −5.2202E−09 | C06 = −1.0507E−09 | C60 = 1.3332E−11 |
| C43 = 1.3382E−10 | C25 = 2.4352E−10 | C07 = 5.2061E−12 |
| C80 = 1.8723E−12 | C62 = 5.7239E−13 | C44 = 8.7985E−12 |
| C26 = −3.1432E−12 | C08 = 1.6969E−12 | |

Focal length data of each reflection surface for the on-axis light beam
Symbol i of fix and fiy corresponds to the i-th reflection surface.
Symbol fix represents the focal length on the X cross section, and symbol fiy represents the focal length on the Y cross section.
Symbol fx is the focal length of the entire system on the X cross section, and symbol fy is the focal length of the entire system on the Y cross section.

| | |
|---|---|
| f1x = 15.886 mm | f1y = 13.824 mm |
| f2x = −13.083 mm | f2y = −18.067 mm |
| f3x = 18.872 mm | f3y = 31.844 mm |
| f4x = −3.792 mm | f4y = −33.890 mm |
| f5x = 15.214 mm | f5y = 20.006 mm |
| fx = 3.664 mm | fy = 3.662 mm |

Shape Data of Each Reflection Surface

Since it has a rectangular shape, twice the value of each of Eaix and Eaiy corresponds to the length of the side of the rectangle.

Symbol i of Eaix and Eaiy corresponds to the i-th reflection surface.

Symbol Eaix is half the length of the side on the X cross section, and symbol Eaiy is half the length of the side on the Y cross section.

| | |
|---|---|
| Ea1x = 8.26 mm | Ea1y = 15.19 mm |
| Ea2x = 5.16 mm | Ea2y = 7.96 mm |
| Ea3x = 15.64 mm | Ea3y = 10.67 mm |
| Ea4x = 1.98 mm | Ea4y = 5.16 mm |
| Ea5x = 9.96 mm | Ea5y = 8.31 mm |

-continued

| |
|---|
| $\omega_x$ = ±20.0 degrees |
| $\omega_y$ = ±40.0 degrees |

Numerical Embodiment 3

The distance from the object plane to the aperture stop SP is infinite, and the angle of view is X: ±23.4 degrees and Y: ±45.0 degrees. The focal length is X: 3.08 mm, and Y: 3.07 mm. The image plane size is x: 2.665 mm, and y: 6.144 mm. The entrance pupil (aperture stop SP) is circular and its diameter is 1.50 mm. The F number for the on-axis light beam is 2.05 in the X axis direction and 2.05 in the Y axis direction. The reflection surfaces of this embodiment are all composed of free-form surfaces, and they have rectangular shapes when they are projected on the XZ plane. The free-form surface shape is given by expression (B).

| Surface data |||||||
|---|---|---|---|---|---|---|
| Surface | Xi | Yi | Zi | Di | θxi | θyi |
| 1(SP) | 0.00 | 0.00 | 0.00 | 19.50 | 0.00 | 0.00 Aperture stop (P) |
| 2(R2) | 0.00 | 0.00 | 19.50 | 32.50 | 22.00 | 0.00 First reflection surface (Q) |
| 3(R3) | 0.00 | −22.58 | −3.88 | 28.00 | −33.93 | 0.00 Second reflection surface (R) |
| 4(R4) | 0.00 | −33.90 | 21.73 | 28.00 | 23.43 | 0.00 Third reflection surface |
| 5(R5) | 0.00 | −44.84 | −4.05 | 27.00 | −29.43 | 0.00 Fourth reflection surface |
| 6(R6) | 0.00 | −60.66 | 17.84 | 27.90 | 17.93 | 0.00 Fifth reflection surface |
| Image plane | 0.00 | −60.66 | −10.06 | | 0.00 | 0.00 IMG0 |

On the YZ plane
Coordinate of point P: (Z, Y) = (0, 0)
Coordinate of point Q: (Z, Y) = (19.5, 0)
Coordinate of point R: (Z, Y) = (−3.88, −22.58)
Accordingly, angle QPR (∠QPR) = 99.75 degrees

Free-form surface data

Second surface (R2): First reflection surface

| | | |
|---|---|---|
| C20 = −1.4893E−02 | C02 = −1.6773E−02 | C21 = −2.2032E−05 |
| C03 = −6.3064E−05 | C40 = −3.9874E−06 | C22 = −4.1247E−06 |
| C04 = −2.5589E−06 | C41 = −2.2583E−07 | C23 = 9.5766E−09 |
| C05 = 5.8535E−09 | C60 = 2.9040E−08 | C42 = −1.1513E−08 |
| C24 = −6.0773E−09 | C06 = −1.5891E−09 | C60 = −2.7303E−10 |
| C43 = −8.1075E−10 | C25 = −3.6056E−10 | C07 = −5.6349E−11 |
| C80 = −1.5748E−10 | C62 = −3.5902E−12 | C44 = −2.6040E−11 |
| C26 = −8.6158E−12 | C08 = −1.5657E−12 | |

Third surface (R3): Second reflection surface

| | | |
|---|---|---|
| C20 = −2.1207E−02 | C02 = −1.1724E−02 | C21 = 1.9046E−04 |
| C03 = 5.8517E−04 | C40 = 2.2458E−05 | C22 = 6.9866E−06 |
| C04 = −2.5894E−06 | C41 = 1.9805E−06 | C23 = −1.6404E−07 |
| C05 = −5.5183E−07 | C60 = −9.0727E−08 | C42 = −1.8299E−07 |
| C24 = 1.3343E−07 | C06 = 8.0509E−08 | C60 = −1.7338E−08 |
| C43 = 2.1474E−09 | C25 = −9.0360E−09 | C07 = −5.2043E−09 |
| C80 = 2.3192E−10 | C62 = 9.8905E−10 | C44 = −4.5892E−10 |
| C26 = 1.8556E−10 | C08 = 1.2945E−10 | |

Fourth surface (R4): Third reflection surface

| | | |
|---|---|---|
| C20 = −1.4596E−02 | C02 = −6.3651E−03 | C21 = −5.0062E−07 |
| C03 = 7.2222E−05 | C40 = −3.1747E−06 | C22 = −3.0927E−06 |
| C04 = 1.1602E−07 | C41 = 9.1936E−09 | C23 = 3.3507E−08 |
| C05 = −2.4505E−08 | C60 = −9.8566E−10 | C42 = −2.8360E−09 |
| C24 = 1.4682E−09 | C06 = 1.0195E−09 | C60 = −6.7513E−12 |
| C43 = 1.0901E−11 | C25 = −4.5804E−11 | C07 = 2.3437E−11 |
| C80 = −1.7633E−12 | C62 = −2.1680E−12 | C44 = −4.0944E−12 |
| C26 = −3.4237E−12 | C08 = −9.2380E−12 | |

Fifth surface (R5): Fourth reflection surface

| | | |
|---|---|---|
| C20 = −9.6737E−02 | C02 = −5.6896E−03 | C21 = −8.0266E−04 |
| C03 = −4.0620E−05 | C40 = −1.5412E−03 | C22 = −1.5134E−04 |
| C04 = −9.1349E−06 | C41 = −2.9410E−05 | C23 = −3.2514E−06 |
| C05 = −1.7053E−07 | C60 = −1.1330E−05 | C42 = −1.1138E−05 |
| C24 = −4.5459E−07 | C06 = −1.9445E−08 | C60 = −5.4040E−06 |
| C43 = −5.7356E−07 | C25 = −4.6356E−08 | C07 = −4.1675E−10 |
| C80 = −5.9302E−06 | C62 = −5.0713E−07 | C44 = −4.5077E−08 |
| C26 = −3.8366E−09 | C08 = 7.3722E−11 | |

Sixth surface (R6): Fifth reflection surface

| | | |
|---|---|---|
| C20 = −1.7904E−02 | C02 = −1.2103E−02 | C21 = 3.3582E−05 |
| C03 = 1.6445E−05 | C40 = −5.9231E−06 | C22 = −7.9199E−06 |
| C04 = −2.5663E−06 | C41 = 3.6808E−08 | C23 = 5.8116E−08 |
| C05 = 1.6611E−08 | C60 = −3.1696E−09 | C42 = −7.8484E−09 |
| C24 = −4.7197E−09 | C06 = −7.9883E−10 | C60 = −3.5176E−12 |
| C43 = 8.6040E−11 | C25 = −1.6527E−12 | C07 = −3.5176E−12 |
| C80 = −5.4449E−12 | C62 = −1.0182E−11 | C44 = −1.4323E−11 |
| C26 = −5.1273E−12 | C08 = −4.1201E−12 | |

Focal length data of each reflection surface for the on-axis light beam
Symbol i of fix and fiy corresponds to the i-th reflection surface.
Symbol fix represents the focal length on the X cross section, and symbol fiy represents the focal length on the Y cross section.
Symbol fx is the focal length of the entire system on the X cross section, and symbol fy is the focal length of the entire system on the Y cross section.

f1x = 18.105 mm     f1y = 13.820 mm
f2x = −14.209 mm    f2y = −17.693 mm

-continued

| | |
|---|---|
| f3x = 18.668 mm | f3y = 36.038 mm |
| f4x = −2.967 mm | f4y = −38.272 mm |
| f5x = 14.676 mm | f5y = 19.653 mm |
| fx = 3.080 mm | fy = 3.071 mm |

Shape Data of Each Reflection Surface

Since it has a rectangular shape, twice the value of each of Eaix and Eaiy corresponds to the length of the side of the rectangle.

Symbol i of Eaix and Eaiy corresponds to the i-th reflection surface.

Symbol Eaix is half the length of the side on the X cross section, and symbol Eaiy is half the length of the side on the Y cross section.

| | |
|---|---|
| Ea1x = 9.59 mm | Ea1y = 17.19 mm |
| Ea2x = 7.38 mm | Ea2y = 8.82 mm |
| Ea3x = 19.05 mm | Ea3y = 8.98 mm |
| Ea4x = 2.64 mm | Ea4y = 4.99 mm |
| Ea5x = 14.72 mm | Ea5y = 8.74 mm |
| ωx = ±23.4 degrees | |
| ωy = ±45.0 degrees | |

TABLE 1

| | | NUMERICAL EMBODIMENT | | |
|---|---|---|---|---|
| | | 1 | 2 | 3 |
| CONDITIONAL EXPRESSION (1) | ∠QPR | 102.73 | 105.35 | 99.75 |
| CONDITIONAL EXPRESSION (2) | $\omega_x$ | 16.9 | 20 | 33.4 |
| | $\omega_y$ | 35 | 40 | 45 |

Table 1 indicates values relating to conditional expressions (1) and (3) in each numerical embodiment. The optical system L0 of the first to third embodiments can be applied to a surveillance camera, a vehicle-mounted camera, an UAV (unmanned aerial vehicle) represented by a drone, and the like. Thus, according to each embodiment, it is possible to provide the optical system capable of reducing an aberration such as distortion that is different for each image height while simultaneously achieving both the wide-angle configuration and reduction in size.

Fourth Embodiment

Figure 14:
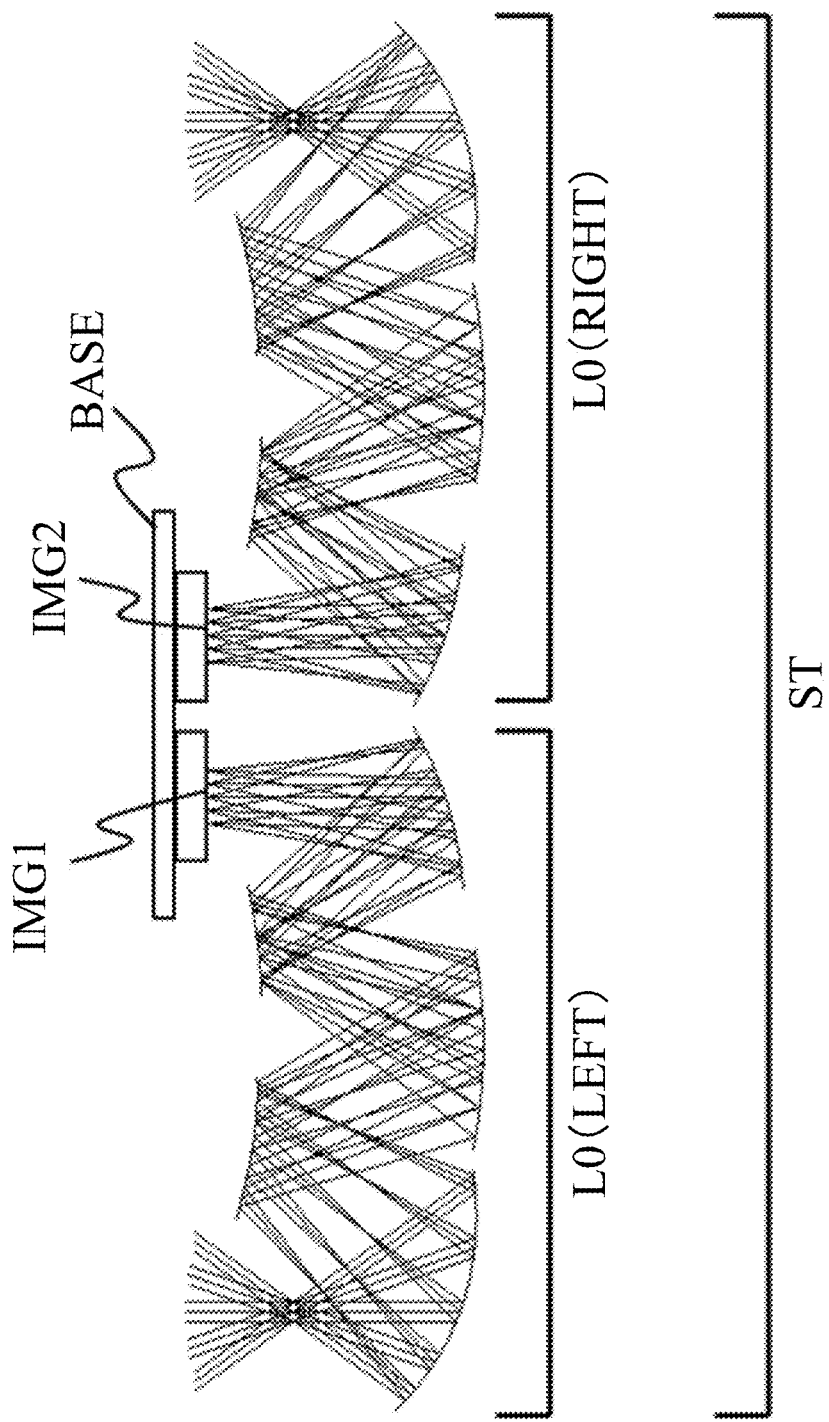
FIG. 14 is a cross-sectional view of a stereo optical system and a schematic arrangement view of an image capturing apparatus in a fourth embodiment.

Next, referring to FIG. 14, a fourth embodiment of the present invention will be described. FIG. 14 illustrates the arrangement (YZ plane) of a stereo optical system ST constituted by using two optical systems L0 of the first to third embodiments. In the stereo optical system ST of FIG. 14, the two optical systems L0 of the first embodiment are arranged in the Y axis direction. However, the arrangement direction of the two optical systems L0 is not limited thereto.

By arranging the two optical systems L0 as illustrated in FIG. 14, the stereo optical system ST having a wide angle of view in a parallax direction can be configured. This enables sensing such as acquiring distance information over a wide range. Further, it is preferred that the two optical systems L0 used as the stereo optical system ST are substantially the same optical system. If the angle of view or the F number is different between the two optical systems, the range in which the sensing is possible is determined by the optical system having a narrow angle of view when used in sensing such as distance measurement or 3D shape measurement. Or, if the depth of field is different, measurement accuracy is deteriorated, which is not preferable.

In this embodiment, it is preferred that the imaging plane (reduction plane) of the two optical systems L0 is on the same plane. Thus, it is possible to easily obtain parallax images (first and second images formed by the two optical systems L0) from the two optical systems L0 using conventional image sensors each having a planar shape. Even when the positions of two image sensors IMG 1 and IMG 2 are not exactly on the same plane due to manufacturing errors or the like, the effect of the present invention can be obtained, so some deviation is permitted.

In FIG. 14, the left optical system L0 is denoted by L0 (LEFT) and the right optical system L0 is denoted by L0 (RIGHT). At this time, the optical system L0 (LEFT) forms an image on the image sensor IMG1. Further, the optical system L0 (RIGHT) forms an image on the image sensor IMG 2. The image sensors IMG1 and IMG 2 are located on the same plane and are fixed to a common substrate BASE.

According to this embodiment, by constructing the stereo optical system using the two optical systems L0, it is possible to provide the stereo optical system capable of reducing an aberration such as distortion that is different for each image height while simultaneously achieving both the wide-angle configuration and reduction in size.

Fifth Embodiment

Figure 15:
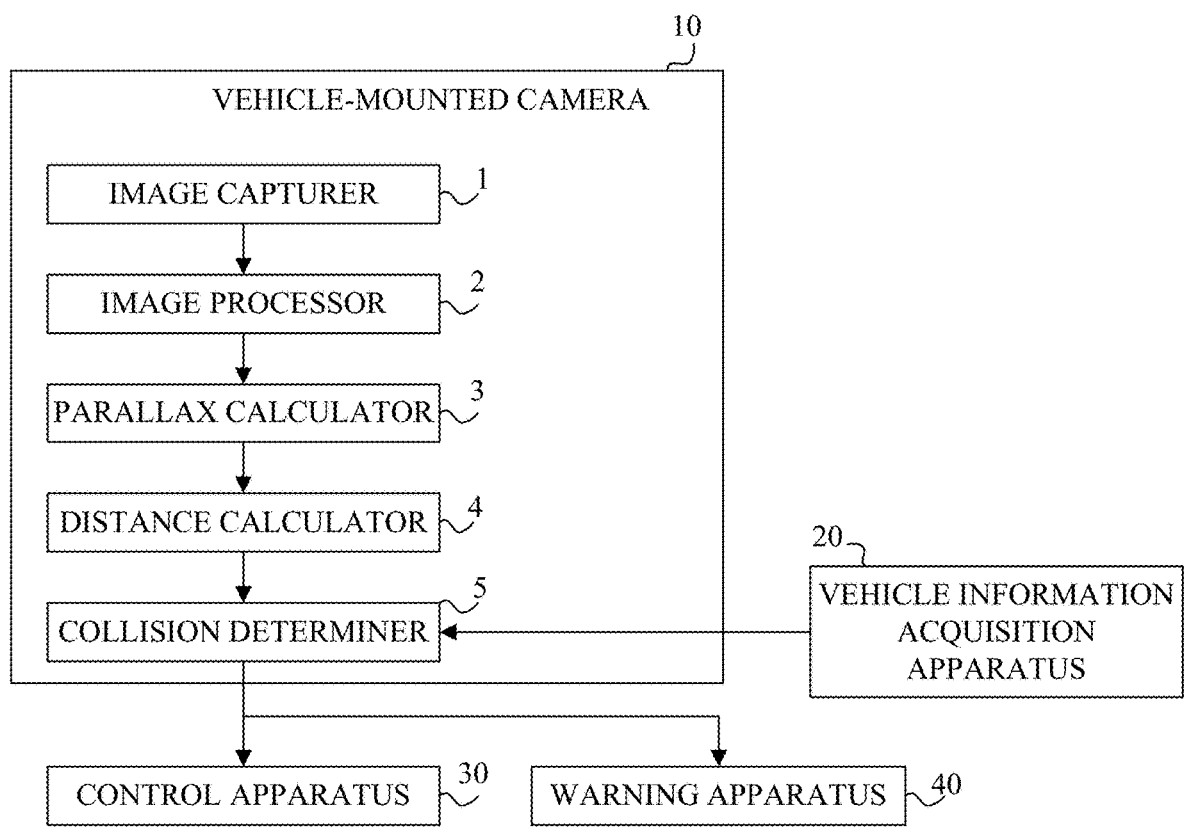
FIG. 15 is a functional block diagram of a vehicle-mounted system in a fifth embodiment.
Figure 16:
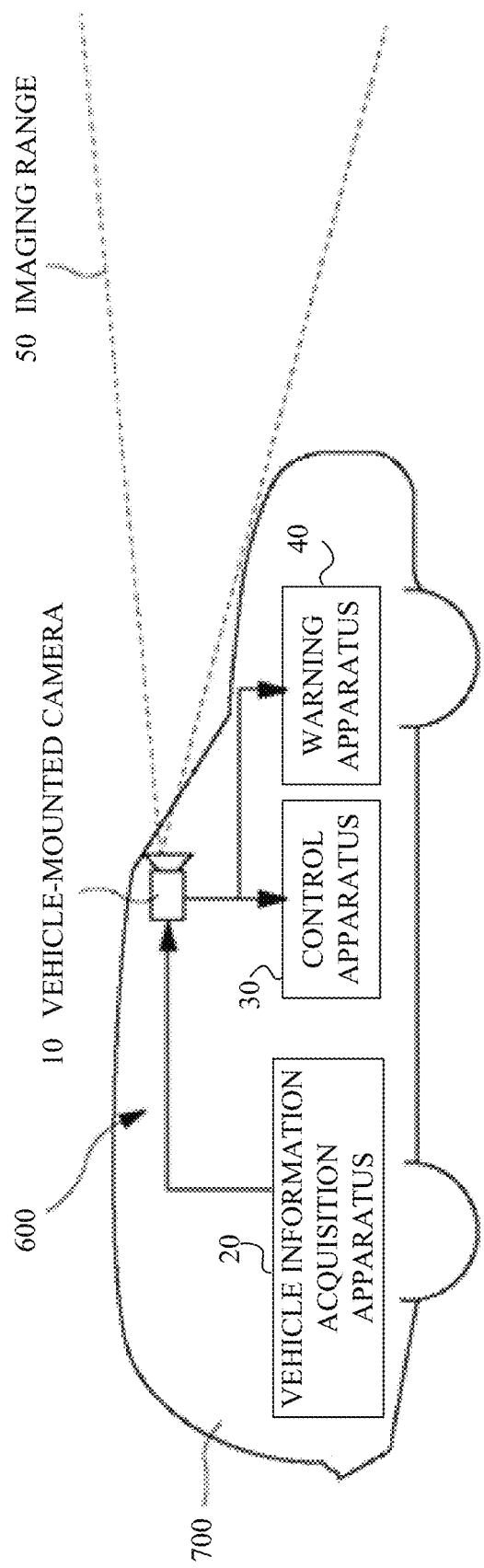
FIG. 16 is a schematic view of a main part of a vehicle in the fifth embodiment.

Next, a vehicle-mounted camera 10 including the optical system L0 of the first to third embodiments or the stereo optical system ST of the fourth embodiment and a vehicle-mounted system (driving support apparatus) 600 including the vehicle-mounted camera 10 will be described. FIG. 15 is a configuration diagram of the vehicle-mounted camera 10 and the vehicle-mounted system 600. The vehicle-mounted system 600 is installed in a vehicle (moving apparatus) such as an automobile and it is an apparatus for supporting driving of the vehicle based on image information around the vehicle acquired by the vehicle-mounted camera 10. FIG. 16 is a schematic diagram of a vehicle 700 equipped with the vehicle-mounted system 600. In FIG. 16, an imaging range 50 of the vehicle-mounted camera 10 is set in front of the vehicle 700, but the imaging range 50 may be set to the rear or side of the vehicle 700.

As illustrated in FIG. 15, the vehicle-mounted system 600 includes the vehicle-mounted camera (distance measuring apparatus 10), a vehicle information acquiring apparatus 20, a control apparatus (ECU: Electronic Control Unit) 30, and a warning apparatus 40. In addition, the vehicle-mounted camera 10 includes an image capturer 1, an image processor 2, a parallax calculator 3, a distance calculator (acquirer) 4, and a collision determiner (determiner) 5. The image processor 2, the parallax calculator 3, the distance calculator 4, and the collision determiner 5 constitute a processor. The image capturer 1 includes the optical system according to any one of the embodiments described above and an image sensor. In the case of the stereo optical system, it includes two left and right optical systems L0 and two image sensors corresponding to the two optical systems L0.

Figure 17:
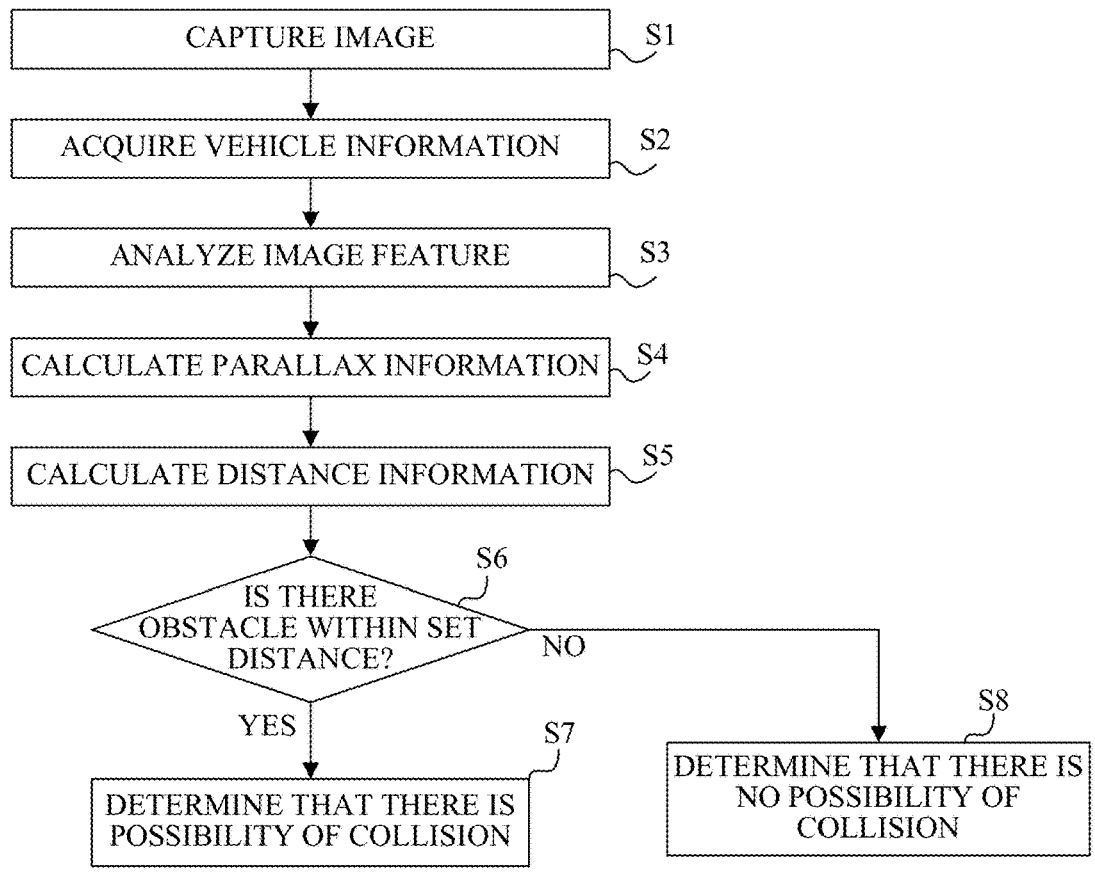
FIG. 17 is a flowchart illustrating an operation example of the vehicle-mounted system in the fifth embodiment.

FIG. 17 is a flowchart illustrating an operation example of the vehicle-mounted system 600. Hereinafter, the operation of the vehicle-mounted system 600 will be described according to this flowchart.

First, at step S1, the image capturer is used to capture an image of a target (an object) around the vehicle to acquire a plurality of pieces of image data (parallax image data). Subsequently, at step S2, vehicle information is acquired from the vehicle information acquirer 20. The vehicle information is information including the vehicle speed, the yaw rate, the steering angle, and the like of the vehicle. Subsequently, at step S3, the image processor 2 performs image processing on the plurality of image data acquired by the image capturer 1. Specifically, it performs image feature analysis to analyze feature quantities such as an amount and a direction of an edge, and a density value in the image data. Here, the image feature analysis may be performed on each of the plurality of image data or on only a part of image data among the plurality of image data.

Subsequently, at step S4, the parallax calculator 3 calculates parallax (image shift) information between the plurality of image data acquired by the image capturer 1. Since known methods such as the SSDA method and the area correlation method can be used as the method of calculating the parallax information, the description is omitted in this embodiment. The processing at steps S2, S3, and S4 may be performed in the above order or may be performed in parallel to each other.

Subsequently, at step S5, the distance calculator 4 calculates interval information (distance information) with respect to the object captured by the image capturer 1. The distance calculator 4 acquires the distance information of the object based on the output of the image sensor. That is, the distance calculator 4 calculates the distance information of the object based on a plurality of images formed via the plurality of optical systems, respectively. The distance information can be calculated based on the parallax information calculated by the parallax calculator 3 and internal parameters and external parameters of the image capturer 1. The distance information includes information on a relative position with respect to the object such as the interval with respect to the object, a defocus amount, and an image shift amount, and it may represent a distance value of the object directly, or alternatively it may represent information corresponding to the distance value indirectly.

Subsequently, at step S6, the collision determiner 5 determines whether the distance information calculated by the distance calculator 4 falls within a range of a preset distance (i.e., set distance which is set in advance). Thus, it is possible to determine whether an obstacle is present within the set distance around the vehicle, and determine the possibility of collision between the vehicle and the obstacle. When there is an obstacle within the set distance, the collision determiner 5 determines that there is the possibility of collision (at step S7), and when there is no obstacle within the set distance, the collision determiner 5 determines that there is no possibility of collision (at step S8).

Next, the collision determiner 5 notifies the control apparatus 30 or the warning apparatus 40 of the determination result when it determines that there is the possibility of collision (at step S7). At this time, the control apparatus 30 controls the vehicle based on the determination result of the collision determiner 5, and the warning apparatus 40 gives a warning based on the determination result of the collision determiner 5.

For example, the control apparatus 30 performs control such as applying a brake, returning an accelerator to the vehicle, generating a control signal for generating a braking force on each wheel to suppress the output of the engine and the motor. Further, the warning apparatus 40 gives warning such as generating an alarm sound (alarm) to a user (driver) of the vehicle, displaying warning information on a screen of a car navigation system, or giving vibration to the seat belt or the steering wheel.

As described above, according to the vehicle-mounted system 600 in this embodiment, the obstacle can be effectively detected by the above-described process, and collision between the vehicle and the obstacle can be avoided. In particular, by applying the optical system in each of the above-described embodiments to the vehicle-mounted system 600, it is possible to perform detection of the obstacle and collision determination over a wide angle of view while miniaturizing the entire vehicle-mounted camera 10 to increase the degree of freedom of arrangement.

Various embodiments are conceivable as to the calculation of the distance information. As an example, a case where a pupil division type image sensor having a plurality of pixel portions regularly arranged in a two-dimensional array is adopted as the image sensor included in the image capturer 1 will be described. In this case, even if the imaging optical system does not constitute the stereo optical system, the distance information can be calculated. In the pupil division type image sensor, one pixel portion is composed of a microlens and a plurality of photoelectric converters, and it can receive a pair of light beams passing through different regions in the pupil of the optical system to output a pair of image data from each photoelectric converter.

Then, the image shift amount of each region is calculated by the correlation calculation between the pair of image data, and an image shift map data representing the distribution of the image shift amount is calculated by the distance calculation section 4. Alternatively, the distance calculator 4 may further convert the image shift amount into a defocus amount to generate defocus map data representing the distribution of the defocus amount (the distribution on the two-dimensional plane of the captured image). Further, the distance calculator 4 may acquire distance map data of the interval to the object to be converted from the defocus amount.

In this embodiment, the vehicle-mounted system 600 is applied to driving support (collision damage reduction), but the present invention is not limited to this, and the vehicle-mounted system 600 may be applied to cruise control (including all vehicle speed follow-up function), automatic driving, and the like. In addition, the vehicle-mounted system 600 is not limited to the vehicle such as a own vehicle, but can be applied to a moving body (a moving apparatus) such as a ship, an aircraft, and an industrial robot. Further, the present invention can be applied not only to the vehicle-mounted camera 10 and the moving body in this embodiment, but also to devices that utilize object recognition widely such as the Intelligent Transportation System (ITS).

The optical system L0 in each embodiment is applied to an image capturing apparatus capable of acquiring the distance information, measuring the 3D shape, or detecting an object such as a person using the image information, but it is not limited to this. The optical system L0 of each embodiment can be applied not only to the surveillance camera and the vehicle-mounted camera, but also to various image capturing apparatuses such as a video camera, a digital still camera, and a camera mounted on a UAV In this way, in each of the embodiments, when the reference axis is defined as a path of the reference ray that passes through the opening center of the aperture stop SP to reach the center of the reduction plane, with respect to at least one reflection surface among the plurality of reflection surfaces, the normal line oat the intersection with the reference axis is inclined with respect to the reference axis. Further, normal lines at the intersection with respect to the reference axis on all the reflection surfaces included in the optical system are inclined with respect to the reference axis in the cross section including the reference axis. The angle ∠QPR (deg) between the line segment PQ connecting the opening center P and the intersection Q and the line segment PR connecting the opening center P and the intersection R is within a predetermined angle range. According to each embodiment, it is possible to provide an optical system, a stereo optical system, an image capturing apparatus, a distance measuring apparatus, a vehicle-counted system, and a moving apparatus including the distance measuring apparatus that is movable while holding the distance measuring apparatus, and a projection apparatus which are capable of reducing distortion while simultaneously achieving a wide angle and miniaturization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Figure 18:
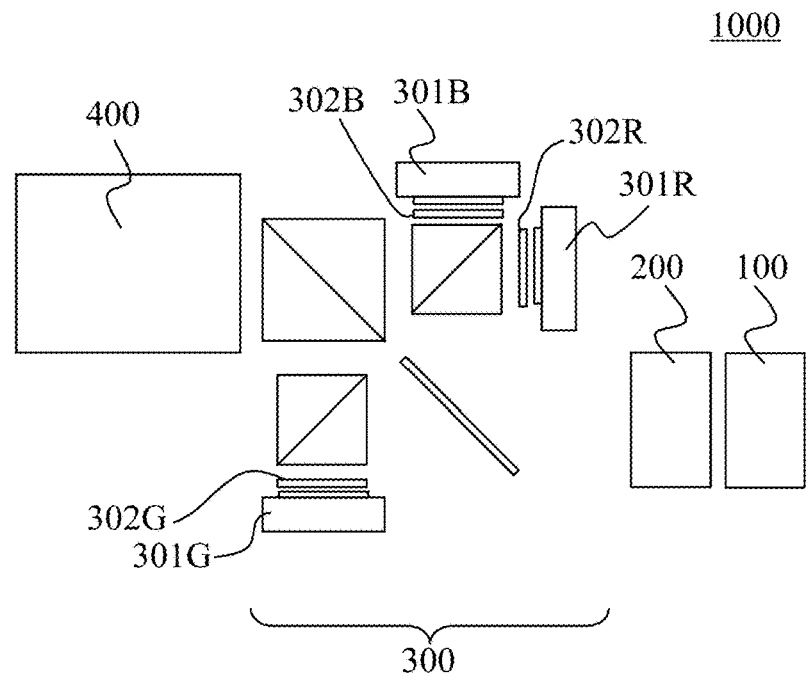
FIG. 18 is a configuration diagram of a projection apparatus in each embodiment.

For example, the optical system L0 of each of the above-described embodiments can be used as a projection optical system to be applied to a projection apparatus. FIG. 18 is a configuration diagram of a projector (projection apparatus) 1000. A reflection type liquid crystal panel is used as a light modulation element of the projector 1000. In FIG. 18, reference numeral 100 denotes a light source, reference numeral 200 denotes an illumination optical system, reference numeral 300 denotes a color separating and synthesizing optical system, and reference numeral 400 denotes a projection optical system (optical system L0). The light source 100 emits light toward the illumination optical system 200. The illumination optical system 200 illuminates the light from the light source 100. The color separating and synthesizing optical system 300 performs color separation and color synthesis on the illumination light from the illumination optical system 200. The projection optical system 400 projects the synthetic light from the color separating and synthesizing optical system 300.

In the color separating and synthesizing optical system 300, reference numerals 301 R, 301 G, and 301 B denote reflection type liquid crystal panel units provided with light modulation elements for red, green and blue (reflection type liquid crystal panels for red, green and blue), respectively. Reference numerals 302R, 302G and 302B denote wave plate units provided with wave plates for red, green and blue, respectively. In this embodiment, the light modulation elements included in each of the reflection type liquid crystal panel units 301R, 301G, and 301B are reflective liquid crystal panels, but the present invention is not limited thereto. For example, a transmissive liquid crystal panel may be used as the light modulation element. Regardless of the number of reflective liquid crystal panels, it can be applied to any projector such as a single plate type or a three-plate type projector.

When the optical system L0 is applied to the projection optical system, a display surface of a display element such as a liquid crystal panel (light modulation element, or spatial modulator) or the like is arranged at the position of the reduction plane of the optical system L0. However, when the optical system is applied to the projection apparatus, the object side and the image side are reversed so that the optical paths are reversed. That is, a configuration in which an image displayed on the display surface (reduction plane) of the display element disposed on the object side is projected (imaged) onto a projection surface (enlargement plane) of a screen or the like arranged on the image side by the optical system can be adopted. Also in this case, it is desirable to satisfy each conditional expression in each embodiment as in the case where the optical system is applied to the image capturing apparatus. Further, when the optical system of each embodiment is applied to the projection apparatus, since the light beam (F number) is determined by the illumination system arranged on the reduction side of the optical system, it is not necessary to provide the aperture stop SP (R1) as an opening. In this case, the position of the opening is defined as an exit pupil.

When the optical system of each embodiment is used as an imaging optical system, the reduction plane (reduction side conjugate plane) corresponds to the image plane (imaging plane), and the enlargement plane (enlargement side conjugate plane) corresponds to the object plane. In the case of the imaging optical system, the reduction side (reduction conjugate side) corresponds to the image side, and the enlargement side (enlargement conjugate side) corresponds to the object side. On the other hand, when the optical system of each embodiment is used as a projection optical system, the reduction plane (reduction side conjugate plane) corresponds to the object plane (display surface), and the enlargement plane (enlargement side conjugate plane) corresponds to the image plane (projection surface). In the case of a projection optical system, the reduction side (reduction conjugate side) corresponds to the object side (display side), and the enlargement side (enlargement conjugate side) corresponds to the image side (projection side).

This application claims the benefit of Japanese Patent Application No. 2017-221657, filed on Nov. 17, 2017, which is hereby incorporated by reference herein in its entirety.

What is claimed is:

1. An optical system that forms an image of an object, comprising:
   an aperture stop;
   a first reflection surface; and
   a second reflection surface,
   wherein:
   the aperture stop, the first reflection surface, and the second reflection surface are disposed in order from an enlargement side to a reduction side,
   an area of the first reflection surface is larger than an area of the second reflection surface, and
   an expression below is satisfied:

$95 < \angle QPR < 120$, where a reference axis is a path of a reference ray that passes through an opening center of the aperture stop to reach a center of a reduction plane, P is the opening center, Q is an intersection of the reference axis and the first reflection surface, R is an intersection of the reference axis and the second reflection surface, and ∠QPR is an angle (deg) between a line segment PQ connecting the opening center P and the intersection Q and a line segment PR connecting the opening center P and the intersection R.

2. The optical system according to claim 1, wherein the area of the first reflection surface is the largest among reflection surfaces included in the optical system.

3. The optical system according to claim 1, wherein the reference axis does not intersect with itself.

4. The optical system according to claim 1, wherein the second reflection surface has a negative power.

5. The optical system according to claim 4, wherein the first reflection surface has a positive power.

6. The optical system according to claim 1, further comprising a third reflection surface, a fourth reflection surface, and a fifth reflection surface,
wherein the aperture stop, the first reflection surface, the second reflection surface, the third reflection surface, the fourth reflection surface, and the fifth reflection surface are disposed in order from the enlargement side to the reduction side.

7. The optical system according to claim 6, wherein the first reflection surface has a positive power, the second reflection surface has a negative power, the third reflection surface has a positive power, the fourth reflection surface has a negative power, and the fifth reflection surface has a positive power.

8. The optical system according to claim 1, wherein normal lines at intersections with the reference axis on all reflection surfaces included in the optical system are inclined with respect to the reference axis in a cross section including the reference axis.

9. The optical system according to claim 1, wherein all reflection surfaces included in the optical system are free-form surfaces.

10. The optical system according to claim 1, wherein an intermediate image of the object is formed between a reflection surface closest to the enlargement side and a reflection surface closest to the reduction side among reflection surfaces included in the optical system.

11. The optical system according to claim 10, wherein the intermediate image of the object is formed between the first reflection surface and the second reflection surface.

12. The optical system according to claim 1, wherein the optical system has a hollow mirror configuration.

13. The optical system according to claim 1, wherein a reflection direction of a ray on an even-numbered reflection surface and a reflection direction of the ray at odd-numbered reflection surface counted from the first reflection surface closest to the enlargement side among reflection surfaces included in the optical system are opposite to each other when seen in a traveling direction of the ray along the reference axis in a cross section including the reference axis.

14. A stereo optical system comprising two optical systems according to claim 1, wherein reduction planes of the two optical systems are on the same plane.

15. An image capturing apparatus comprising:
the stereo optical system according to claim 14; and
an image sensor configured to receive images formed by the two optical systems.

16. An image capturing apparatus comprising:
the optical system according to claim 1; and
an image sensor configured to receive an image formed by the optical system.

17. The image capturing apparatus according to claim 16, wherein an expression below is satisfied:

$$\omega x < \omega y$$

where $\omega y$ is a half angle of view (deg) in a first cross section including the reference axis, and $\omega x$ is a half angle of view (deg) in a second cross section perpendicular to the first cross section.

18. The image capturing apparatus according to claim 16, wherein an expression below is satisfied:

$$35 \leq \omega y$$

where $\omega y$ is a half angle of view (deg) in a first cross section including the reference axis.

19. A distance measuring apparatus comprising:
the image capturing apparatus according to claim 15; and
an acquirer configured to acquire distance information of the object based on an output of the image sensor.

20. A vehicle-mounted system comprising:
the distance measuring apparatus according to claim 19; and
a determiner configured to determine a possibility of collision between a vehicle and the object based on the distance information.

21. The vehicle-mounted system according to claim 20, further comprising a control apparatus configured to output a control signal for generating a braking force to each wheel of the vehicle when the determiner determines that there is the possibility of collision between the vehicle and the object.

22. The vehicle-mounted system according to claim 20, further comprising a warning apparatus configured to give a warning to a driver of the vehicle when the determiner determines that there is the possibility of collision between the vehicle and the object.

23. A moving apparatus comprising the distance measuring apparatus according to claim 19, wherein the moving apparatus is movable while holding the distance measuring apparatus.

* * * * *